(12) United States Patent
Vintila

(10) Patent No.: US 12,380,444 B2
(45) Date of Patent: *Aug. 5, 2025

(54) ELECTRONIC DOCUMENT PLATFORM

(71) Applicant: ROYAL BANK OF CANADA, Toronto (CA)

(72) Inventor: Iustina-Miruna Vintila, Bucharest (RO)

(73) Assignee: ROYAL BANK OF CANADA, Toronto (CA)

( * ) Notice: Subject to any disclaimer, the term of this patent is extended or adjusted under 35 U.S.C. 154(b) by 226 days.

This patent is subject to a terminal disclaimer.

(21) Appl. No.: 17/508,362

(22) Filed: Oct. 22, 2021

(65) Prior Publication Data

US 2022/0044232 A1 Feb. 10, 2022

Related U.S. Application Data

(63) Continuation of application No. 16/078,946, filed as application No. PCT/CA2017/050221 on Feb. 22, 2017, now Pat. No. 11,176,550.

(60) Provisional application No. 62/298,434, filed on Feb. 22, 2016.

(51) Int. Cl.
*G06Q 20/38* (2012.01)
*G06F 16/27* (2019.01)
(Continued)

(52) U.S. Cl.
CPC .......... *G06Q 20/389* (2013.01); *G06F 16/27* (2019.01); *G06Q 20/3829* (2013.01);
(Continued)

(58) Field of Classification Search
CPC ... G06Q 20/389; G06Q 20/3829; G06Q 40/02
See application file for complete search history.

(56) References Cited

U.S. PATENT DOCUMENTS 5,717,989 A 2/1998 Tozzoli
7,778,921 B2 8/2010 Carlos et al.
(Continued)

OTHER PUBLICATIONS

European Patent Office (EPO), Communication pursuant to Article 94(3) EPC issued to EP Application No. 21154980.3, Jul. 7, 2022.
(Continued)

*Primary Examiner* — Steven S Kim
(74) *Attorney, Agent, or Firm* — Norton Rose Fulbright Canada LLP

(57) ABSTRACT

Systems, methods, and computer-readable media are provided in relation to electronic document platforms. An example method may include receiving a new electronic letter of credit request, the request identifying letter of credit parameters, and at least one condition of the letter of credit associated with corresponding party profiles; obtaining a public key associated with each of the party profiles; generating a plurality of blocks on a distributed ledger on a node of a distributed plurality of nodes, each of the blocks associated with a corresponding condition of the at least one condition to be effected and encrypted with a public key corresponding to the party profile associated with the condition; and generating signals to initiate propagation of the plurality of blocks to the distributed plurality of nodes.

20 Claims, 17 Drawing Sheets

(51) Int. Cl.
    *G06Q 40/02* (2023.01)
    *H04L 9/06* (2006.01)
    *H04L 9/30* (2006.01)
(52) U.S. Cl.
    CPC .......... *G06Q 40/02* (2013.01); *H04L 9/0637* (2013.01); *H04L 9/30* (2013.01)

(56) References Cited

U.S. PATENT DOCUMENTS

| | | | |
|---|---|---|---|
| 9,608,829 B2 | 3/2017 | Spanos | |
| 11,176,550 B2* | 11/2021 | Vintila | H04L 9/0637 |
| 2015/0356555 A1 | 12/2015 | Pennanen | |
| 2015/0379510 A1 | 12/2015 | Smith | |
| 2016/0330031 A1 | 11/2016 | Drego | |
| 2017/0046693 A1 | 2/2017 | Haldenby | |
| 2017/0046694 A1 | 2/2017 | Chow | |
| 2017/0103390 A1 | 4/2017 | Wilson | |
| 2017/0187535 A1 | 6/2017 | Middleton | |
| 2017/0214699 A1 | 7/2017 | Johnsrud | |
| 2017/0243193 A1 | 8/2017 | Manian | |
| 2022/0052857 A1* | 2/2022 | Middleton | G06Q 20/065 |

OTHER PUBLICATIONS

China National Intellectual Property Administration (CNIPA), Office Action against Chinese Patent Application No. 201780025143.X dated Mar. 3, 2022.
Antonopoulos, A., "Mastering Bitcoin", Dec. 2014.
Wielens, K., "How Blockchain can Transform Supply Chain Finance", Feb. 17, 2016, https://www.thrglobaltreasurer.com/category/; Feb. 17, 2016.
International Search Report and Written Opinion issued in International Patent Application No. PCT/CA2017/050221, dated May 30, 2017.
Reiten, P. et al., "MicroChain: Transparent Philanthropic Microlending", 6.857 Network and Computer Security, Massachusetts Institute of Technology, published online on Jun. 11, 2016.
"International banking: Blockchain—The next big thing", The Economist, May 9, 2015.
Extended European Search Report issued in European Patent Application No. 17755672.7, dated Jul. 18, 2019.
Australian Examination Report No. 1 issued in Australian Patent Application No. 2017222708, dated Jun. 27, 2019.
Chinese Examination Report No. 1 issued in Chinese Patent Application No. 201780025143, dated Apr. 30, 2021.
Extended European Search Report issued in European Patent Application No. 21154980.3, dated Jun. 4, 2021.
European Search Reported dated Jan. 29, 2024 issued in Application EP 23 22 0605.
Office Action dated Dec. 21, 2023 issued in CA Application 3015394.
IP Australia, Examination Report No. 1 to AU Application No. 2022206741, Jun. 23, 2023.
IP Australia, Examination Report No. 2 issued to AU Application No. 2022206741, Apr. 11, 2024.
Canadian Intellectual Property Office, Office Action issued in CA Application No. 3,015,394, dated May 15, 2024.

* cited by examiner

CERTIFICATE SIGNED BY
NO.

200

Applicant:

Credit number :
Date of Delivery :
Ocean vessel: :
Transport receipt :
Place of taking in charge :
Place of receipt :
Port of loading :
Port of discharge :
Place of delivery :
Container / Seal No. :

| SIZE OZ | DESCRIPTION OF GOODS | THE NUMBER OF CASES | EACH PACKAGE | | TOTAL OF WEIGHT | |
|---|---|---|---|---|---|---|
| | | | NET | GROSS | NET | GROSS |
| | | QTY (CARTONS) | LBS | LBS | LBS | LBS |
| | _PRODUCTION DATED CODES:_ | The number of cases per each production date: | | | | |
| | TOTAL | | | | | |

- WOULD LIKE TO CERTIFY THAT FULL CARGO HAS BEEN INSPECTED AND FOUND SUITABLE TO EXPORT.
SIGNATURE

FIG. 2

400 

XXXXX

DATE OF ISSUE: XXXXX  OUR REFERENCE NUMBER:
XXXXXXX
DATE OF EXPIRY: XXXXX
PLACE OF EXPIRY: XXXXX

BENEFICIARY:          APPLICANT:
XXXXX                 XXXXX

AMOUNT: CAD XXXXX

IRREVOCABLE STANDBY LETTER OF CREDIT NO. XXXXX.

WE HEREBY ISSUE IN YOUR FAVOUR THIS IRREVOCABLE STANDBY LETTER OF CREDIT WHICH IS AVAILABLE BY PAYMENT AGAINST YOUR WRITTEN DEMAND ADDRESSED TO XXXXX, BEARING THE CLAUSE:- "DRAWN UNDER STANDBY LETTER OF CREDIT NO. XXXXX ISSUED BY XXXXX", WHEN ACCOMPANIED BY THE FOLLOWING DOCUMENTS:

1. YOUR SIGNED CERTIFICATE STATING THAT FUNDS DRAWN REPRESENT MONIES OWED TO YOU BY XXXXX FOR XXXXX PROVIDED TO XXXXX.

2. THE ORIGINAL OF THIS STANDBY LETTER OF CREDIT.

PARTIAL DRAWINGS ARE PERMITTED.

REQUEST FOR ANY AMENDMENT EXCEPT REDUCTION IN AMOUNT MUST BE MADE DIRECTLY TO OUR CUSTOMER WHO WILL THEN INSTRUCT US ACCORDINGLY.

IT IS A CONDITION OF THIS STANDBY LETTER OF CREDIT THAT IT SHALL BE DEEMED TO BE AUTOMATICALLY EXTENDED WITHOUT AMENDMENT FOR A FURTHER ONE (1) YEAR PERIOD FROM THE PRESENT OR ANY FUTURE EXPIRATION DATE HEREOF, UNLESS AT LEAST SIXTY (60) DAYS PRIOR TO THE PRESENT OR ANY FUTURE EXPIRATION DATE, WE NOTIFY THE BENEFICIARY IN WRITING BY REGISTERED MAIL OR COURIER THAT WE ELECT NOT TO CONSIDER THIS STANDBY LETTER OF CREDIT EXTENDED FOR ANY SUCH ADDITIONAL PERIOD.

THIS STANDBY LETTER OF CREDIT MAY ALSO BE CANCELLED PRIOR TO THE EXPIRY DATE UPON OUR RECEIPT AT OUR ABOVE-NOTED ADDRESS OF THE ORIGINAL STANDBY LETTER OF CREDIT AND THE BENEFICIARY'S SIGNED LETTER ADDRESSED TO US REQUESTING CANCELLATION OF THE STANDBY LETTER OF CREDIT.

THIS STANDBY LETTER OF CREDIT IS SUBJECT TO INTERNATIONAL STANDBY PRACTICES (ISP98), ICC PUBLICATION NUMBER 590.

WE ENGAGE TO HONOUR PRESENTATIONS SUBMITTED WITHIN THE TERMS AND CONDITIONS INDICATED ABOVE.

XXXXX

----------------------          ----------------------
AUTHORIZED SIGNATURE            OTHER SIGNATURE

FIG. 4

```
                    SWIFT760 - GUARANTEE
          :TO : RECEIVING BANK NAME AND ADDRESS
                         <ADDRESS>
                   :27 : SEQUENCE OF TOTAL
                          : : 1/1
              :20 : TRANSACTION REFERENCE NUMBER
                         : : XXXXX
                 :23 : FURTHER IDENTIFICATION
                        : : REQUEST
                         :30 : DATE
                         : : XXXXX
                    :40C: APPLICABLE RULES
                         : : ISPR
                   :77C: DETAILS OF GUARANTEE
  : : PLEASE ISSUE ON OUR BEHALF AND FULL RESPONSIBILITY YOUR STANDBY
  : : LETTER OF CREDIT IN FAVOUR OF THE BENEFICIARY IN YOUR STANDARD
       : : FORMAT IN SPANISH LANGUAGE WITH THE FOLLOWING DETAILS:
                         : : QUOTE
                    : : BENEFICIARY: XXXXX
                    : : APPLICANT: XXXXX
              : : AMOUNT: USD.XXXXX  UNITED STATES DOLLARS.
               : : EXPIRY: XXXXX  AT YOUR COUNTERS IN XXXXX
  : : PURPOSE: GUARANTEE FOR CORRECT INVESTMENT OF ADVANCE OF CONTRACT
         : : 'ACQUISITION AND COMMISSIONING OF XXXXX, CORRESPONDING TO
                : : 30 PERCENTAGE OF TOTAL AMOUNT AWARDED.
              : : ONLY ONE DRAWING IN WHOLE OR IN PART IS PERMITTED.
     : : THIS STANDBY LETTER OF CREDIT IS SUBJECT TO INTERNATIONAL STANDBY
               : : PRACTICES (ISP98), ICC PUBLICATION NUMBER 590.
                         : : UNQUOTE
         : : IN CONSIDERATION OF YOUR ISSUING YOUR STANDBY LETTER OF CREDIT AS
    : : REQUESTED ABOVE, WE, XXXXX, HEREBY ISSUE OUR COUNTER STANDBY LETTER
                : : OF CREDIT NO. XXXXX  IN YOUR FAVOUR, AND HEREBY
            : : IRREVOCABLY UNDERTAKE TO INDEMNIFY AND REIMBURSE YOU FOR AND
        : : AGAINST ALL SUMS WHICH YOU MAY BE CALLED UPON TO PAY UNDER YOUR
                     : : SAID STANDBY LETTER OF CREDIT.
        : : OUR COUNTER STANDBY LETTER OF CREDIT TOWARDS YOU IS VALID UNTIL
              : : XXXXX (I.E. 30 DAYS BEYOND THE VALIDITY OF YOUR STANDBY
                       : : LETTER OF CREDIT).
             : : ONLY ONE DRAWING IN WHOLE OR IN PART IS PERMITTED.
            : : CLAIM MADE BY YOU UNDER THIS COUNTER STANDBY LETTER OF CREDIT
               : : WILL BE PAID ON YOUR WRITTEN DEMAND BY AUTHENTICATED SWIFT
          : : PROVIDED YOUR CLAIM IS SUBMITTED TO US ON OR BEFORE THE EXPIRY
           : : DATE OF THIS COUNTER STANDBY LETTER OF CREDIT AND THAT SUCH
         : : AMOUNT REPRESENTS THE AMOUNT YOU HAVE BEEN CALLED UPON TO PAY
                : : UNDER OUR LOCAL LETTER OF CREDIT NUMBER XXXXX.
             : : IN CASE OF EXECUTION, PAYMENT SHALL BE MADE TO THE ACCOUNT THAT
   : : XXXXX MAINTAINS XXXXX, AND ALL COSTS ASSOCIATED WITH THE TRANSFER SHALL BE
              : : COVERED BY THE ISSUING BANK OF THIS COUNTER GUARANTEE.
           : : ALL THE BANKING FEES, COMMISSIONS AND EXPENSES OUTSIDE OF XXXXX
                     : : WILL BE PAID BY APPLICANT.
          : : THIS COUNTER STANDBY LETTER OF CREDIT IS SUBJECT TO INTERNATIONAL
              : : STANDBY PRACTICES (ISP98), ICC PUBLICATION NUMBER 590.
        : : PLEASE DELIVER THE STANDBY LETTER OF CREDIT TO THE BENEFICIARY,
                        : : ATTN: XXXXX.
       : : KINDLY FORWARD TWO COPIES OF YOUR STANDBY LETTER OF CREDIT TO US
                : : FOR OUR FILES AT OUR ADDRESS INDICATED BELOW.
                         : : XXXXX
                   :72 : BANK TO BANK INFORMATION
                : : NO MAIL CONFIRMATION TO FOLLOW.
```

FIG. 5

ELECTRONIC DOCUMENT PLATFORM

CROSS-REFERENCE TO RELATED APPLICATIONS

This application is a Continuation of U.S. application Ser. No. 16/078,946 filed on Aug. 22, 2018, which is a US 371 application of PCT Application No. PCT/CA2017/050221 filed on Feb. 22, 2017, which claims all benefit including priority to U.S. Provisional Patent Application 62/298,434, entitled "Electronic Document Platform", and filed Feb. 22, 2016, all of which are incorporated herein by reference in their entireties.

FIELD

Some embodiments described herein generally relate to the field of electronic document platforms, and more particularly, systems and methods for utilizing blockchain technologies in the context of trade finance are provided.

BACKGROUND

Electronic document platforms can reduce the burden of physical paper documents. However, there may be various technical challenges associated with the technical characteristics of the electronic document platform.

SUMMARY

In accordance with an aspect, there is provided a method for electronic trade finance transactions utilizing distributed ledgers. The method includes: receiving a new electronic letter of credit request, the request identifying letter of credit parameters, and at least one condition of the letter of credit associated with corresponding party profiles; obtaining a public key associated with each of the party profiles; generating a plurality of blocks on a distributed ledger on a node of a distributed plurality of nodes, each of the blocks associated with a corresponding condition of the at least one condition to be effected and encrypted with a public key corresponding to the party profile associated with the condition; and generating signals to initiate propagation of the plurality of blocks to the distributed plurality of nodes.

In some embodiments, the method includes: receiving, at a node of the distributed plurality of nodes, a request to record a transaction related to a block in the plurality of blocks, the request indicating that at least a portion of a condition associated with the block has been satisfied, the request including a private key; upon validating that the private key corresponds to the public key of the block at least the portion of the condition indicated in the request to record the transaction, recording the transaction on the distributed ledger of the node; and generating signals to initiate propagation of the transaction across the distributed plurality of nodes.

In any of the above embodiments, the method may include: upon a ledger of a node of the distributed plurality of nodes associated with a fund-holding party having a state wherein each of the plurality of blocks associated with a corresponding condition have been satisfied by one or more propagated transactions, generating a trigger signal for initiating a release of funds in accordance with the letter of credit parameters.

In any of the above embodiments, the letter of credit parameters may include data for validation by a corresponding party to confirm a condition has been satisfied; the method comprising: encrypting the data for validation with the public key associated with the party profile of the corresponding party.

In any of the above embodiments, each party profile corresponding to at least one condition of the letter of credit can be associated with a least one node in the distributed plurality of nodes.

In any of the above embodiments, the party profiles may include profiles associated with parties involved in a shipment process associated with the letter of credit; and wherein at least one of the conditions of the letter of credit is based on the shipment process.

In any of the above embodiments, the party profiles may include profiles associated with at least one of: a shipment carrier, a stevedore, a ship, a port, a custom officer, a warehouse, or an inspection officer.

In any of the above embodiments, the method may include: receiving, at a node of the plurality of distributed nodes, a modification request to modify at least one parameter or condition associated with the shipment process, the request encoded with the public key associated with a party profile of a party required to validate the modification request; recording a branch of blocks on the distributed ledger of the node, the branch of blocks indicating of the requested modification to the shipment process, the branch of blocks including an initial block to be effected by a transaction and encrypted with a public key associated with at least one authorizing party; generating signals to initiate propagation of the branch across the distributed plurality of nodes.

In any of the above embodiments, the plurality of blocks may be ordered with a cascaded hash such that a second transaction cannot be recorded before a first transaction has been recorded on a distributed ledger.

In any of the above embodiments, the method may include: receiving a status request; and querying the distributed ledger to identify a most recently recorded transaction.

In any of the above embodiments, obtaining the public key associated with each of the party profiles may include: generating a public-private key pair for each of the party profiles; and communicating the private key from the public-private key pair to the corresponding party.

In any of the above embodiments, the letter of credit parameters may include at least one of: a goods identifier, a quantity, shipping trade terms, or carrier terms.

In any of the above embodiments, generating the plurality of blocks may include: generating blocks in a tree structure, each branch of the tree structure defining conditions for partial satisfaction of the conditions of the letter of credit, wherein completion of conditions associated with a particular branch triggers partial release of funds in accordance with the letter of credit parameters.

In any of the above embodiments, the conditions of the particular branch may be associated with a partial shipment of goods in accordance with the letter of credit parameters.

In any of the above embodiments, generating the plurality of blocks on the distributed ledger may include encrypting parameters associated with one or more blocks with one or more encryption keys based on an access level associated with the block.

In accordance with an aspect, there is provided a system for managing conditions for electronic trade finance transactions utilizing distributed ledgers on a plurality of nodes. The system includes: a memory device for storing distributed ledger data; and at least one processor of one or more of the plurality of nodes. The at least one processor is configured for: receiving a new electronic letter of credit request, the request identifying letter of credit parameters, and at least one condition of the letter of credit associated with corresponding party profiles; obtaining a public key associated with each of the party profiles; generating a plurality of blocks on a distributed ledger on a node of a distributed plurality of nodes, each of the blocks associated with a corresponding condition of the at least one condition to be effected and encrypted with a public key corresponding to the party profile associated with the condition; and generating signals to initiate propagation of the plurality of blocks to the distributed plurality of nodes.

In accordance with an aspect, there is provided a computer-readable medium or media having stored thereon computer-readable instructions. When executed by at least one processor of one or more of a plurality of nodes, the instructions configure the at least one processor for: receiving a new electronic letter of credit request, the request identifying letter of credit parameters, and at least one condition of the letter of credit associated with corresponding party profiles; obtaining a public key associated with each of the party profiles; generating a plurality of blocks on a distributed ledger on a node of a distributed plurality of nodes, each of the blocks associated with a corresponding condition of the at least one condition to be effected and encrypted with a public key corresponding to the party profile associated with the condition; and generating signals to initiate propagation of the plurality of blocks to the distributed plurality of nodes.

In accordance with an aspect, there is provided a system for providing an electronic document platform including at least a plurality of distributed electronic ledgers, each distributed electronic ledger storing at least one cryptographically linked sequence of records, the system including: a plurality of distributed computing nodes, each distributed computing node including: a processor and a computer-readable medium having machine-readable instructions stored thereon, which when executed by the processor, cause the processor to: host the distributed ledger corresponding to the distributed computing node; apply a set of rules adapted to govern modifications to the at least one cryptographically linked sequence of records, where a modification conducted at an individual distributed computing node propagates corresponding modifications at other distributed computing nodes linked to the individual distributed computing node; receive, from a party to a transaction, electronic information having form field objects representative of characteristics of or changes to trade financing documentation; and generate a new information block either cryptographically linked to an existing block in the sequence of records or representative of a new sequence of records, the new information block adapted to include at least the electronic information received from the party to the transaction.

In another aspect, transaction involves the sale or exchange of goods, and the transaction involves one or more contracts that are represented by the trade financing documentation.

In another aspect, each of the one or more contracts is represented by a cryptographically linked sequence of records corresponding to the contract.

In another aspect, each of the cryptographically linked sequences of records corresponding to one or more the contracts are linked to one another.

In another aspect, machine-readable instructions further cause the processor to: traverse the at least one cryptographically linked sequence of records to determine whether one or more conditions are met; and upon a determination that the one or more conditions are met, generate a notification representative of a successful completion.

In another aspect, trade financing documentation includes at least one of a bill of lading and a letter of credit, the trade financing documentation including electronic form fields corresponding to characteristics of the trade financing documentation.

In another aspect, trade financing documentation includes electronic linkages to at least (i) one or more inventory management devices and (ii) one or more shipping management devices, and the electronic linkages are utilized by at least one distributed computing node to propagate updates to the cryptographically linked sequence of records where updated inventory or shipping information is received or not received after a duration of time.

In another aspect, trade financing documentation include one or more contractual clauses adapted for modification or acceptance by parties to the transaction, the acceptance by parties to the transaction evidenced by electronic signatures.

In another aspect, electronic signatures are associated with trigger conditions included as characteristics associated with the trade financing documentation.

In another aspect, set of rules include one or more consensus rules, which when applied, restrict the propagation of corresponding modifications unless majority consensus is achieved by first modifying the longest linked sequence of records stored amongst the plurality of electronic ledgers.

In another aspect, plurality of distributed computing nodes include at least at least one of computing devices associated with financial institutions, insurance organizations, import organizations, export organizations, regulatory bodies, and shipment organizations.

In another aspect, plurality of distributed computing nodes contains a plurality of groupings of one or more distributed computing nodes, the groupings each having a corresponding set of rules governing access to the information stored on the cryptographically linked sequence of records, the corresponding set of rules governing access related to a privacy level associated with each of the groupings.

In another aspect, plurality of distributed computing nodes contains a plurality of groupings of one or more distributed computing nodes, the groupings each having a corresponding set of rules governing modification to the information stored on the cryptographically linked sequence of records, the corresponding set of rules governing modifications related to a modification level associated with each of the groupings.

In another aspect, machine-readable instructions further cause the processor to: traverse the at least one cryptographically linked sequence of records to conduct one or more electronic queries of information stored on the cryptographically linked sequence of records.

In another aspect, one or more electronic queries include queries to assess at least one of record completeness, condition satisfaction, and record accuracy.

In another aspect, one or more electronic queries include queries to generate one or more reports based at least on characteristics stored on the at least one cryptographically linked sequence of records compared against information stored on (i) one or more inventory management devices or (ii) one or more shipping management devices.

In another aspect, one or more electronic queries include queries to perform one or more audits of the trade financing documentation.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 2 is illustrative of an example certificate, in accordance to some embodiments.

FIG. 4 is an example letter of credit having various characteristics, according to some embodiments.

FIG. 5 is another example guarantee of a letter of credit, according to some embodiments

DETAILED DESCRIPTION

Figure 1:
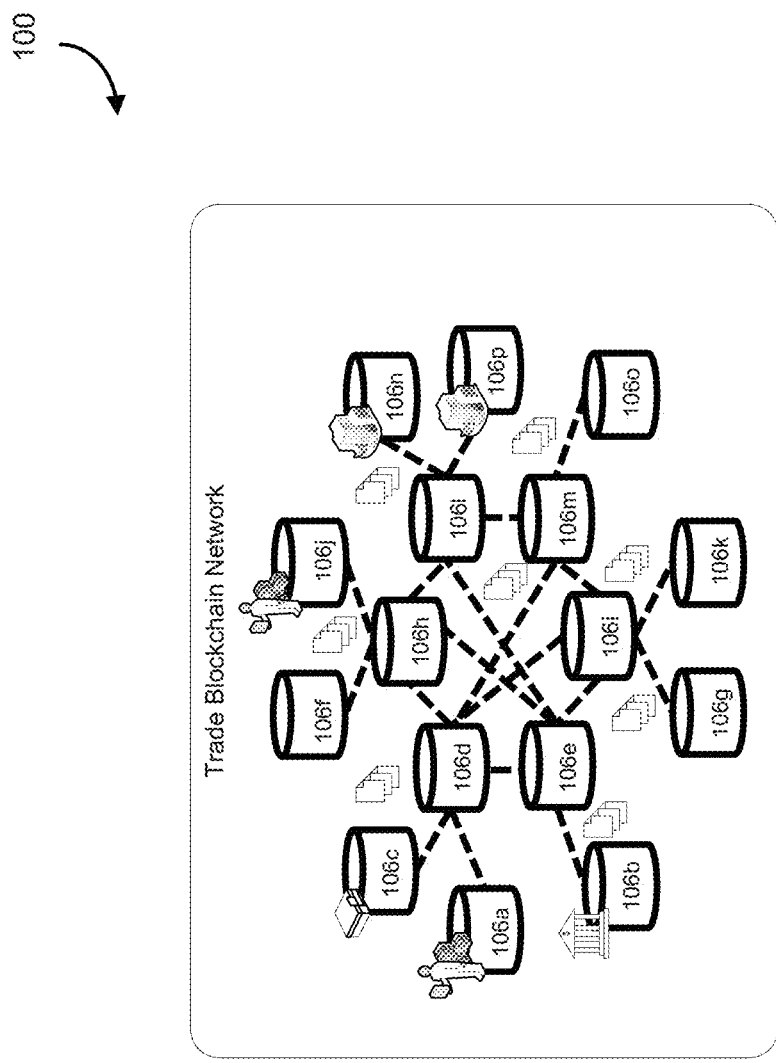
FIG. 1 is a block schematic diagram of an example system for blockchain-based smart contracting, in accordance with some embodiments.

In some embodiments, various systems, methods, and/or computer-readable media may be provided in relation to electronic document platforms, and more particularly, systems, methods, and/or computer-readable media for blockchain-based smart contracting.

In some embodiments, a blockchain implementation is described wherein distributed ledger blocks corresponding to conditions of an electronic document are stored on a series of decentralized devices acting as node computing devices each having a copy of the distributed ledger managed on the node computing device in accordance with electronic propagation mechanisms (e.g., consensus mechanisms used to effect state transitions in relation to the updating of the nodes such that the distributed ledgers contain the same entries across the decentralized network) that are used to validate and verify transactions/activities that relate to the satisfaction or failure of a conduction of the electronic document. The blockchain implementation provides improvements in event ordering (e.g., transactions are ordered based on their timestamp, in a FIFO queue), block creation (e.g., transactions are stored in immutable corresponding blocks), block chaining (e.g., blocks are chained using the previous block hash, before being codified in a system chain, improving the integrity of the events stored in the blockchain and permits for easy queries by way of traversal), ability to register transactions by various parties.

In some embodiments, a blockchain system may provide a technical improvement over a centralized document management system in some aspects, with corresponding tradeoffs in relation to distributed control and overall complexity. For example, there are increased complexities in configuring nodes to manage the distributed ledgers such that, insomuch as possible, a single view of the distributed ledger is promoted at a given time (e.g., prevention of forks/collisions in ledger entry generation). Distributed ledger specific considerations require a technical approach to rectify/avoid (e.g., a potential for conflicting transactions) while maintaining a sufficient level of transaction comfort (e.g., probability that a transaction is properly confirmed and propagated across the distributed ledgers) and security.

Import/export transactions often involve the sale or exchange of goods, and the transactions may be based on and/or characterized by one or more contracts that are represented by the trade financing documentation. For example, trade financing documentation may include at least one of a bill of lading and a letter of credit, which may include electronic form fields corresponding to characteristics of the trade financing documentation. Other trade financing documentation may include invoices, cover sheets, regulatory statements, certificates of origins, certificates, packing lists, attestations, customs invoices, among others.

A letter of credit is a combination of a bank guarantee issued by a bank upon the request of the buyer in favor of the seller (through an advising bank) and a payment at sight or at a later stage against presentation of documents which conform to specified terms and conditions. The purpose of a letter of credit is to substitute the credit of the bank for that of the customer, for the purpose of facilitating trade. A letter of credit may have various characteristics (e.g., expressed through contractual provisions), such as:

Period of validity: a letter of credit could be either irrevocable or revocable, (although the ICC rules are irrevocable), Time for payment: when payment is to be made to the seller. It can be payable either at sight or at a specified time, by deferred payment or by acceptance.

At sight: will be paid on presentation of documents, either at the issuing bank, the advising bank or any other nominated bank.

A term: will be paid at a later stage: this can be done either through presentation of a bill of exchange (to be accepted by a financial institution), and may be conducted by a stipulated deferred payment in the terms of the letter of credit Place of presentation of documents: the place where the documents are to be payable Level of security: The issuing bank may guarantee a letter of credit for the entire period of its validity without exception.

The bill of lading may be a document issued by a carrier which details a shipment of merchandise and gives title of that shipment to a specified party. There may be various relationships between fields and/or characteristics stored on the bill of lading, and for example, the bill of lading may be associated with the terms of the letter of credit and may require cross-verification to ensure compliance with contractual provisions. To sign off on a bill of lading, for example, there may be various aspects that may need to be signed off, and such aspects may be related to conditions and/or provisions that are representative of contractual obligations.

Accordingly, trade financing documentation may include one or more contractual clauses adapted for modification or acceptance by parties to the transaction, the acceptance by parties to the transaction evidenced by electronic signatures. These contractual obligations may be electronically tracked, such that various required sign-offs, conditions, and events may need to be recorded. There is an intersection of physical characteristics and electronically monitoring that may be applied, and there are many interactions on the transactions may be impacted.

For example, goods may originate from a producer who produces the goods from raw materials. These goods may be shipped to a destination by a number of different carriers who may operate on different modes of travel (e.g., land, air, sea). As the goods are unloaded and loaded at various points using various equipment, (e.g., by stevedores or baggage handlers), intermixed, separated, etc., the goods may be damaged in the process.

Thus, import/export transactions may be complicated and complex as there may be various contractual provisions in force at any given time. The trade financing documentation may be electronically linked to inventory management devices and/or shipping management devices such that the linkages are utilized by to propagate updates to the cryptographically linked sequence of records where updated inventory or shipping information is received or not received after a duration of time.

In some embodiments, a blockchain system can, in some instances, allow for all parties involved in the trade finance to update the conditions and/or documents in the blockchain. In some instances, this may allow for close to real time status of a trade finance process (accounting for blockchain propagation delays, etc.) to be available to any number of parties involved in the process.

In a traditional trade finance process, physical bills of lading and other document parameters are verified (e.g. goods characteristics, status and counts along a shipment route) by a person who initials and/or physically signs specific documents with limited information.

In contrast, the distributed nature of the blockchain may provide access to every block in the blockchain to every party. In some instances, unlike a traditional trade finance process, a blockchain system can involve privacy and data access control issues not present in the traditional process.

In some embodiments, aspects of the system may provide for electronically securing parameters of a trade finance blockchain such that they can only be accessed by particular parties, while maintaining the distributed nature and accessibility of the blockchain.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 7:
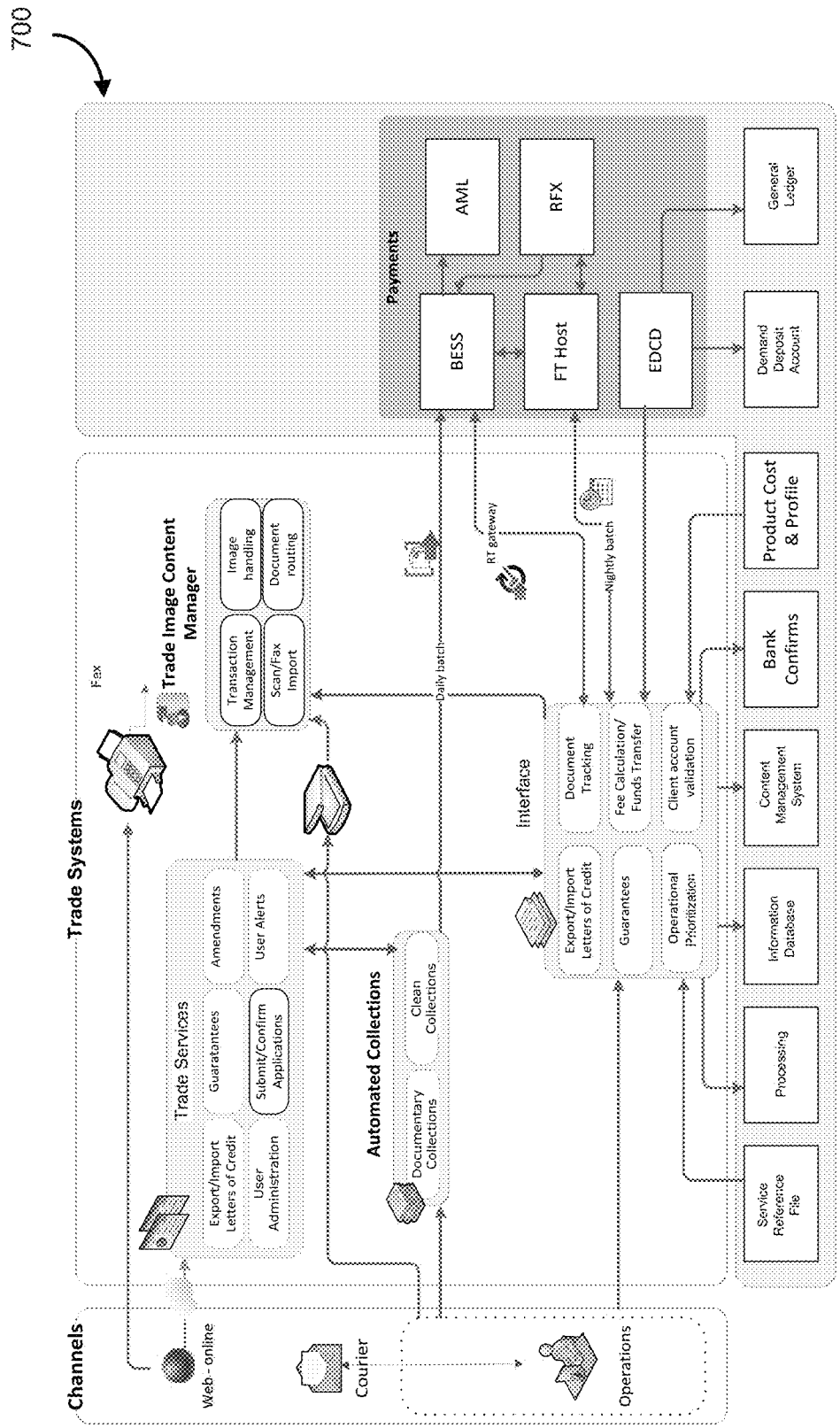
FIG. 7 is an example flowchart of a process for provisioning contracts, managing transactions, and/or maintaining trade documents.

A centralized system may include manual record keeping and records for sign-off by parties, as illustrated in FIG. 7. Keeping accurate records may be crucial in determining whether contractual provisions are fulfilled properly, and where they are breached, to determine where and when a breach occurred, and which party was responsible for the breach. The centralized system of FIG. 7 may be face challenges in tracking such breaches as there may be a lack of an updated ledger storing records of the interactions, and accordingly, it may be difficult to ascertain which party is responsible for a suboptimal outcome.

FIG. 1 is a block schematic diagram of an example system 100 for blockchain-based smart contracting, in accordance with some embodiments.

System 100 is adapted to provide an electronic document platform. System 100 includes, for example, distributed electronic ledgers, each distributed electronic ledger storing at least one cryptographically linked sequence of records. A potential benefit to the electronic document platform of system 100 may be a system wherein clients may be able to transact more efficiently, and securely, having real time (or near-real time) access to their trade transaction information. From a transaction processing perspective, there may be a simplified letter of credit verification process, and reduced times required for letter of credit processing.

In relation to importers and exporters, there may be various goals in using a system such as the system depicted in FIG. 1. For example, importers and exporters may be motivated:

to manage commercial contracts and agreements within digitized processes to create, validate, track and approve;

to provide automatic validation of terms and conditions for import/export agreements;

to enforce contractual terms in real time and be able to track life events impacting the import/export transaction;

to ensure transparent and real time access to data in their global trade transactions;

to provide accelerated cycle time for the entire import/export operation;

to ensure trust, security and compliance for all import/export operations; and to reduce exposure to financial, counterparty, and documentation risks, among others.

The advising and issuing bank may be motivated:

to automate and digitize the processing for the import/export operations;

to reduce the reliance on manual review, preparation and processing of the trade documents;

elimination of letter of credit discrepancies/errors thru online agreement of the terms and conditions between importer/exporter;

in-line negotiation facilities that allow both parties to confirm, reject and request terms of the credit details before involving bank partners;

to reduce operational overhead incurred in document creation, acceptance and verification;

to accelerate the time for creating, accepting and verifying the required documents in import/export agreements, by eliminating acceptance deadlines;

to provide secure transmission and non-repudiation of terms and conditions for import/export operations;

to provide immutable trade finance instruments, securely encoded and authenticated in the ledger;

to provide immutable auditing and tracking of the entire trade/finance process;

to provide real-time reconciliation and settlement of the documentary transactions; and to reduce exposure to financial, documentation (disputes) and fraud risks, among others.

System 100 described below, in some embodiments, provides a block-chain based contracting system that is adapted for computationally administering, tracking, and/or auditing the one or more contracts that are represented by the trade financing documentation. System 100 may be provided in a decentralized architecture that is operable to manage trade finance processes for import/export operations by providing in a distributed, private Blockchain ledger network for all supply chain partners, which may encode the documentary instruments for trade finance as smart contracts/agents, residing on the blockchain network.

As provided in system 100, digitized documents and trade finance instruments are authenticated, immutable and tracked throughout their entire lifecycle as the documents reside in various forms on the distributed ledger. There may be strict regulatory requirements regarding the provisioning and/or usage of the trade finance instruments. There is an increased need for such instruments to be precise and reliable, and available for auditing.

A block-chain based decentralized contracting system 100 may provide potentially beneficial features such as secured, immutable letter of credit storage; automatic processing of unstructured documents and metadata extraction, among others. Through traversal of the blockchain, operators and/or entities may be able to perform verifications, transparent process tracking, and/or reporting.

Entities may be able to facilitate operations more effectively, for example, being able to eliminate and/or reduce various manual processes, reduce incomplete verifications and/or being able to track operations against various databases and records in a secure and up to date manner, reducing risk involved in various transactions. The system 100 may be configured such that differing levels of access may be provisioned, such that, for example, regulators and/or auditors are able to access the system to traverse entries but not make changes in generating own reports that compile data based on the practically immutable records stored on the distributed ledger.

Each of the one or more contracts may be represented by a cryptographically linked sequence of records corresponding to the contract, and the cryptographically linked sequences of records corresponding to one or more the contracts are linked to one another.

The distributed electronic ledgers are stored on distributed computing nodes illustrated as 106a-106p, each distributed computing node 106 being a computing device having a processor and a computer-readable medium having machine-readable instructions stored thereon. Nodes 106a-106p may be adapted such that the nodes are associated with various types of organizations, and/or computing systems. For example, such organizations may include financial organizations (e.g., banks), insurance organizations (e.g., shipping insurance), common carriers, shipping companies, port companies, regulators, etc. Computing systems may include inventory management systems, shipping and/or delivery tracking systems, SKU databases, etc.

Each distributed computing node 106 may be configured to host the distributed ledger corresponding to the distributed computing node. The distributed ledger is adapted for implementing a blockchain where computing rules and/or conditions are utilized to determine how the blockchain interacts with various record entries, queries, etc. For example, distributed computing node 106 may be configured such that a set of rules is applied, the rules adapted to govern modifications to the at least one cryptographically linked sequence of records.

Modification(s) conducted at an individual distributed computing node propagates corresponding modifications at other distributed computing nodes linked to the individual distributed computing node.

Distributed computing node 106 is configured to receive, from a party to a transaction, electronic information having form field objects representative of characteristics of or changes to trade financing documentation.

When distributed computing node 106 receives such information, distributed computing node 106 may be configured to encapsulate such information to generate an information block. This new information block may be cryptographically linked to an existing block in the sequence of records.

Where the new information block is representative of a new sequence of records, the new information block may be adapted to include at least the electronic information received from the party to the transaction, and a new sequence of records may be started (e.g., a new blockchain may be started in relation to a new contract or document).

The set of rules include one or more consensus rules, which when applied, restrict the propagation of corresponding modifications unless majority consensus is achieved by first modifying the longest linked sequence of records stored amongst the plurality of electronic ledgers.

System 100 may be utilized to track changes to provisions of contracts as the contracts are being negotiated. Where the performance of the contracts is being monitored and/or tracked, the contracts may be tracked at a clause and/or provision level to determine whether various clauses and/or provisions are satisfied (or not satisfied).

Further, the contracts may be "signed off" on through the use of various mechanisms to track performance and/or manual indications of authorized signings. Distributed computing node 106 may be configured such that various conditions and triggers are applied to determine a contract's status (e.g., contract fulfilled in full, partially fulfilled, in progress, contract breach has occurred). For example, goods may be delivered in the wrong order, damaged during transport, having the wrong temperature (e.g., spoiled), wet, mislabelled, incomplete, under the wrong shipping terms, etc.

Distributed computing node 106 may be interfaced with (e.g., through an application programming interface) to robustly track shipping, import and/or export operations. Electronic sign-offs by individuals may be tracked, and conditions may be compared against records stored on external databases, such as inventory systems, etc.

The cryptographically linked sequences of records may be configured such that a block-chain type technical implementation is used to establish relationships between records stored, the collection of records and sequences thereof forming various distributed ledgers that are stored across a distributed set of nodes.

These nodes are computing devices that maintain the ledgers stored thereon and conduct modifications to the ledgers based on a set of clearly defined logical rules. Changes are propagated across the ledgers based on these rules (e.g., consensus updating rules), and cryptographic techniques may be utilized to establish how/when changes should be propagated or not.

Cryptographic techniques may also be used to obfuscate and/or control access to information stored on the distributed ledgers. In some embodiments, various levels of permission and access may be established through the use of combined keys and/or encryption techniques that may permit the use of multiple keys and/or keys having differing levels of permissions and/or capabilities (e.g., read/write, and limitations thereof).

For example, the linked sequences of records may be traversed in various ways such that various reporting, auditing, tracking, and/or monitoring techniques may be used to analyze the distributed ledgers.

In an embodiment, a tool is used to traverse the at least one cryptographically linked sequence of records to determine whether one or more conditions are met; and upon a determination that the one or more conditions are met, generate a notification representative of a successful completion or an unsuccessful completion. Such a tool may also be used to track, in real-time or near-real time, the status of an import/export contract such that progress can be determined and/or compared against various metrics. For example, where electronic signatures are required, they may be associated with trigger conditions included as characteristics associated with the trade financing documentation.

The plurality of distributed computing nodes 106a-106p may contain a plurality of groupings of one or more distributed computing nodes, the groupings each having a corresponding set of rules governing access to the information stored on the cryptographically linked sequence of records, the corresponding set of rules governing access related to a privacy level associated with each of the groupings.

In another aspect, plurality of distributed computing nodes contains a plurality of groupings of one or more distributed computing nodes, the groupings each having a corresponding set of rules governing modification to the information stored on the cryptographically linked sequence of records, the corresponding set of rules governing modifications related to a modification level associated with each of the groupings.

Where reports may be desired to be conducted on the distributed ledger, a computing node 106a may be utilized conduct one or more electronic queries of information stored on the cryptographically linked sequence of records. For example, one or more electronic queries may include queries to assess at least one of record completeness, condition satisfaction, and record accuracy. In another aspect, one or more electronic queries include queries to generate one or more reports based at least on characteristics stored on the at least one cryptographically linked sequence of records compared against information stored on (i) inventory management devices or (ii) shipping management devices. In another aspect, one or more electronic queries include queries to perform one or more audits of the trade financing documentation.

Accordingly, system 100 may provide various benefits to entities transacting in relation to the distributed ledgers stored on the computing nodes 106a-106p. For example, entities may be able to obtain real time or near real-time access to funds, and as a result of the consensus process involved in updating the distributed ledger, there may be real time clearing and settlement. There may be increased automation of import/export processes and monitoring may be performed against external databases to increase reliability. Operational efficiencies may be increased by eliminating manual processes, and due to the accessible nature of the distributed ledgers, there may be full end-to-end process transparency between participants, which may include, for example, real time access to trade information, to all or some of the involved parties, etc.

The provisioning of various rules, triggers, and conditions, may aid in the automated execution between transacting parties, which may help reduce and/or eliminate coordination and operational overhead. As the distributed ledger may store records cryptographically linked to one another in the form of record blocks, contract information may be difficult and/or practically impossible to modify, such that irreversible contracts can be employed that are only executed when the predefined terms are met, minimizing and/or eliminating counterparty risk.

FIG. 2 is illustrative of an example certificate 200, in accordance to some embodiments. The certificate 200 provides various elements of information which may be used to update the records stored on the distributed ledger, for example.

Figure 3:
FIG. 3 is an example application for a letter of credit, according to some embodiments.

FIG. 3 is an example application 300 for a letter of credit, according to some embodiments. As indicated in application 300, the letter of credit may have various field form objects that may be machine-interpreted upon completion of the application by an individual. The field form objects may include, for example, full names and addresses of the parties to the contract, contact information, currency, amounts, expiry dates, shipments from and to locations, terms, container shipments, whether partial shipments are allowed, etc. In some embodiments, additional characteristics, such as whether forward contracts are utilized and cover credit may be included, etc.

FIG. 4 is an example letter of credit 400 having various characteristics, according to some embodiments. The example letter 400 of FIG. 4 may indicate that such a letter is revocable, required clauses, accompanying documentation required, whether partial drawings are allowed, extension terms, standby practices applicable, etc. Signatures may be required and/or affixed to the letter of credit 400.

FIG. 5 is another example guarantee of a letter of credit 500, according to some embodiments. The letter of credit 500 may include transaction information, and may, similar to the example of FIG. 4, contain various characteristics and provisions. The letter of credit 500 is provided in the form of a SWIFT transaction system guarantee.

Figure 6:
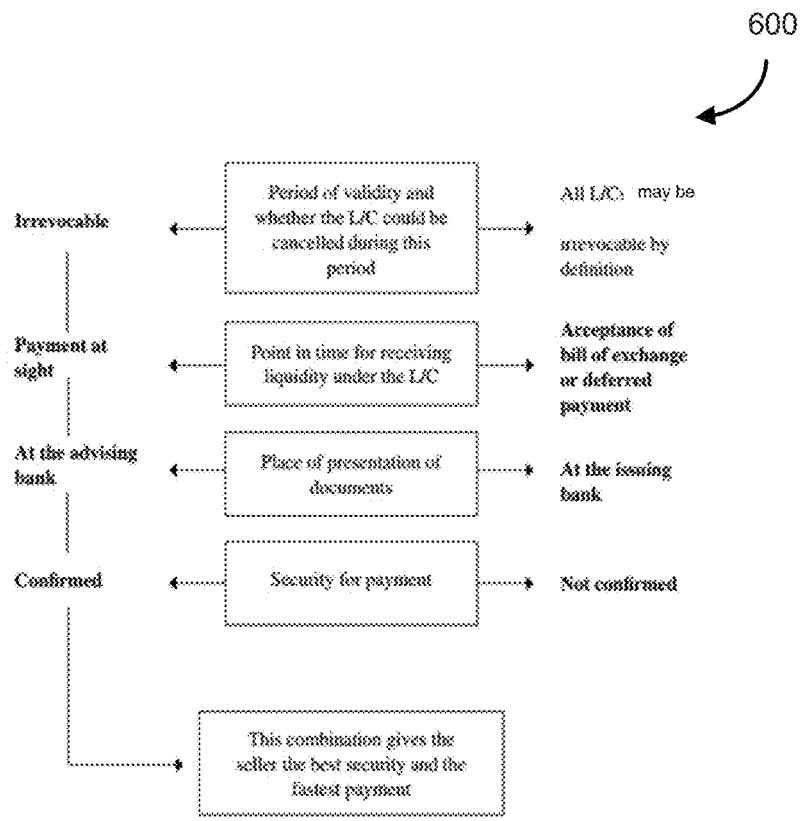
FIG. 6 is an example flowchart of a process for providing a letter of credit, according to some embodiments.

FIG. 6 is an example flowchart 600 of a process for providing a letter of credit, according to some embodiments. As depicted in 600, various combinations of characteristics may occur, which may impact the level of security and speed of payment associated with a transaction.

FIG. 7 is an example flowchart 700 of a process for provisioning contracts, managing transactions, and/or maintaining trade documents. As illustrated in FIG. 7, a centralized system may be utilized wherein information regarding payments, operations, trade systems, etc., may be received, processed, and analyzed. The centralized system of FIG. 7 may be a paper intensive process, where a lack of automation and standardization poses significant overhead and increased costs to entities. The document verification process of FIG. 7 may be inefficient, prone to errors, and reliant on manual processes (e.g., missing documents, incorrect terms, description of goods etc.). Where centralized systems are used, multiple point-to-point connections may be necessary, and silo-ed systems may present a risk in relation to the flow of information.

Figure 8:
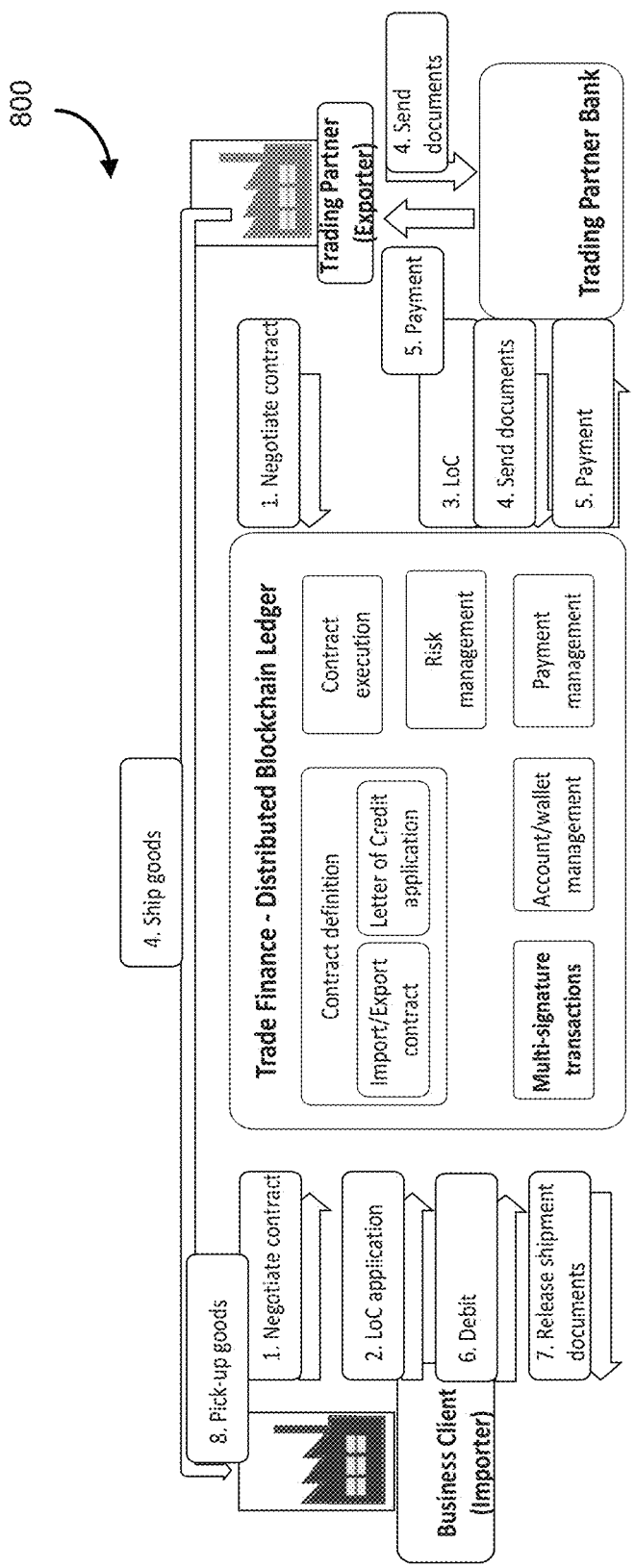
FIG. 8 is an example flowchart of a process where a blockchain-based distributed ledger may be implemented, according to some embodiments.

FIG. 8 is an example flowchart 800 of a process where a blockchain-based distributed ledger may be implemented, according to some embodiments. The blockchain ledger of 800 may be provided in the form of distributed ledgers stored across various nodes 106a-106n as provided in FIG. 1.

Figure 9:
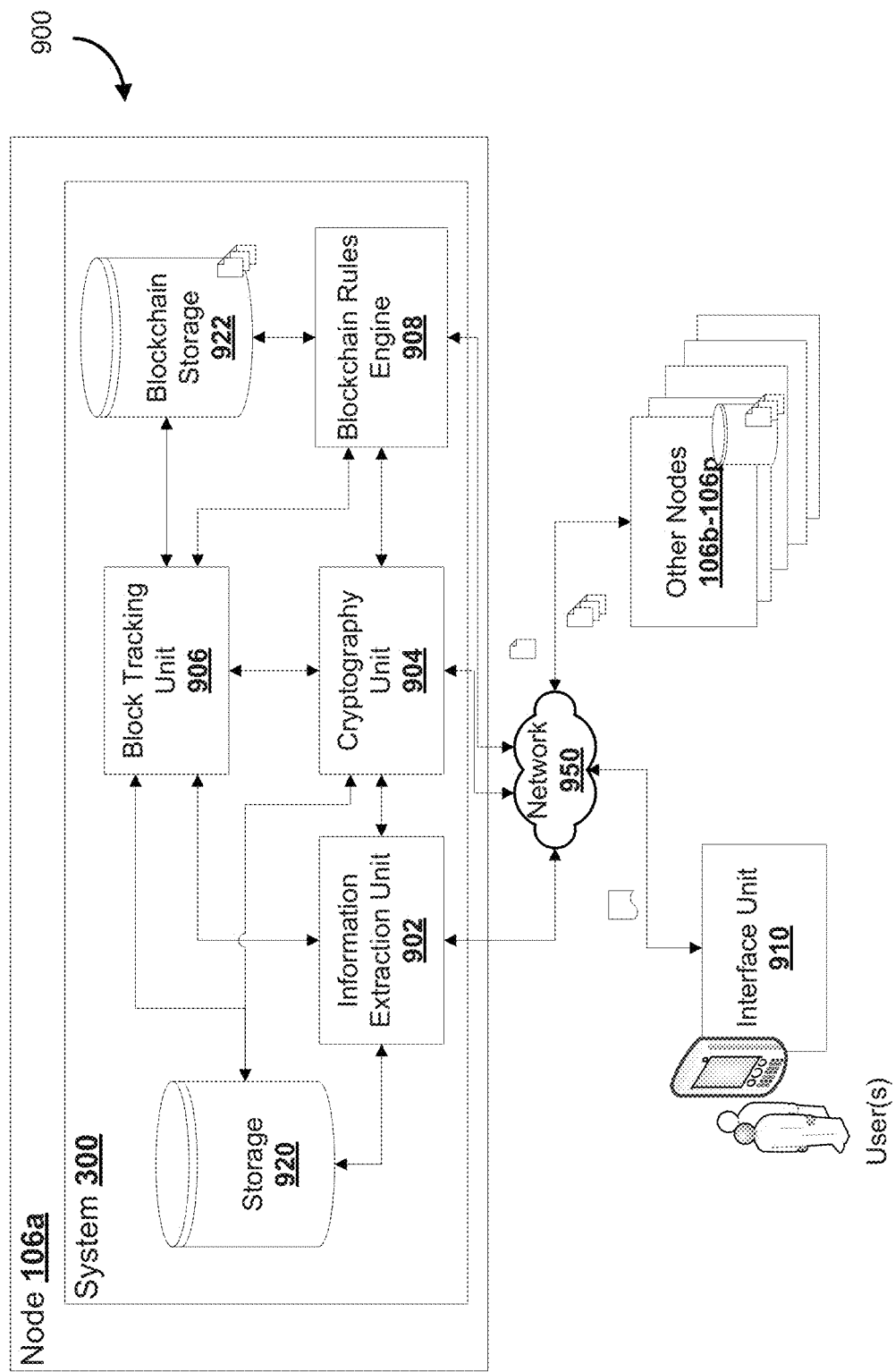
FIG. 9 is an example block schematic diagram illustrative of an example node, according to some embodiments.

FIG. 9 is an example block schematic diagram 900 illustrative of an example node 106a. The nodes 106a-106p provide a decentralized, peer-to-peer, secured network, providing ledger nodes to the trading partners banks (issuing, advising, confirming etc.) in a closed loop, permissioned environment. The number of nodes may vary, for example, such that the system 100 is able to scale up or down under load, to respond to various request rates, and the nodes 106a-106p may also be tracked to provide real-time (or near-real time) monitoring of the system 100, to ensure high availability, and ability to react and prevent system downtimes The node 106a may be comprised of one or more units being provided through various computing embodiments, such as using a combination of hardware, software, and/or embedded firmware. For example, the node 106a and its units may be implemented using servers, processors, computer-readable memory, storage devices, etc. In some embodiments, the node 106a may be provided by distributed resources (e.g., through a "cloud computing" implementation).

The node 106a may be comprised of units, including an information extraction unit 902, a cryptography unit 904, a block tracking unit 906, a blockchain rules engine 908, a blockchain database 916, and a storage 920 and a blockchain storage 922. The node 106a may be configured to interact with an interface unit 910, which for example, may be a user system and/or any type of automated system (e.g., interfacing through an API) that may be performing various activities in relation to the blockchain (e.g., inventory systems and/or shipping systems). For example, interface unit 910 may be a financial institution computing device that indicates that a contract should be added to the blockchain ledger. The interface unit 910 may provide this information through network 950 to the information extraction unit 902.

The information extraction unit 902 may be configured for extracting various elements of information from information sources, such as contracts, transaction records, documents, financial statements, inventory systems, etc. These information sources may provide information in the form of electronic documentation, etc.

In some embodiments, the information extraction unit 902 is configured to anonymize and/or redact information, and/or extract only a subset of information relevant to a particular purpose. This information may be stored at storage 920.

The cryptography unit 904 may be configured for encrypting and/or otherwise transforming information provided by information extraction unit 902, for example, applying various encryption algorithms and/or techniques (e.g., public key/private key encryption) to extracted elements of information. In some embodiments, the cryptography unit 904 may be configured to generate information which may be utilized in the formation and/or generation of one or more blocks for insertion and/or addition into the blockchain. The cryptography unit 904 may, in some embodiments, utilize various combinations and/or versions of keys such that differing levels of access and/or modification ability can be provisioned. For example, some keys may be indicative only of read access, while other keys may allow modification. In some embodiments, keys may be have to be utilized together to permit modification or access.

The block tracking unit 906 may be configured for maintaining relationships and/or associations identifying how blocks may be related to one another, and/or the identity of various blocks (e.g., identifying what information is associated with each block).

The blockchain rules engine 908 may be configured for maintaining and updating one or more blockchains, the blockchain rules engine 908 may be configured, for example, to apply, execute, update, etc., various rules and/or logic associated with the blockchain. For example, rules may be associated with consensus requirements for updating blocks, adding blocks and/or deleting blocks, validating new blocks, rejecting new blocks, etc. The rules may be stored in the storage 920, or in the blockchain storage 922. The blockchain rules engine 908 may operate in conjunction with various provisions of the trade finance contracts, for example, causing various events to occur only when certain conditions are met or triggers have been triggered.

Figure 10:
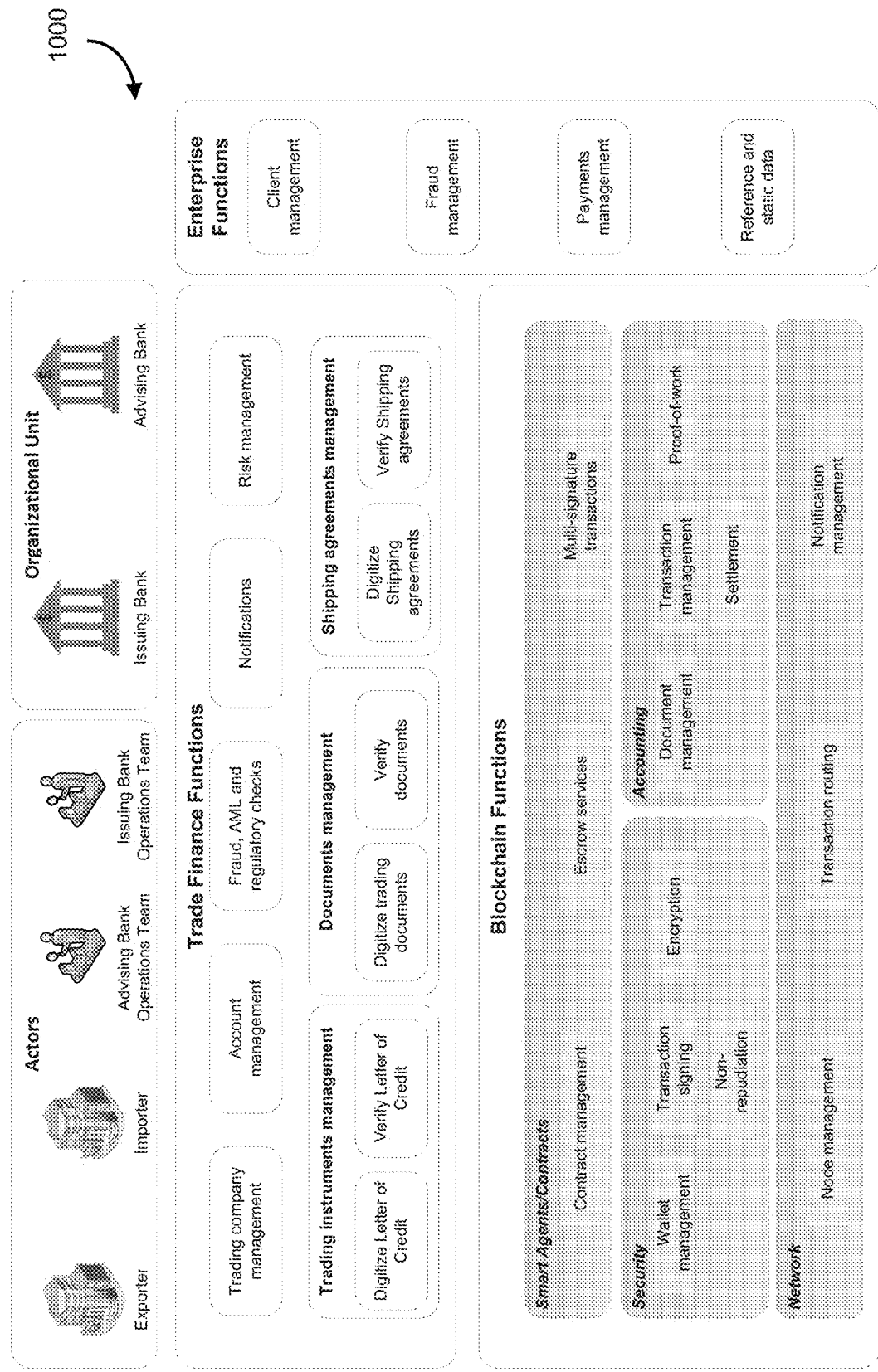
FIG. 10 is an example set of functionality that may be provided, according to some embodiments.

The blockchain storage 922 may be configured to store information associated with the blockchain, such as the blockchain ledger, blockchain entries, information stored on various blocks, linkages between blocks, rules associated with the blockchain, etc. Storage 920 and/or blockchain storage 922 may be provided using various types of storage technologies, such as solid state drives, hard disk drives, flash memory, and may be stored in various formats, such as relational databases, non-relational databases, flat files, spreadsheets, extended markup files, etc. FIG. 10 is an example set of functionality that may be provided by the blockchain functions, according to some embodiments.

Figure 11:
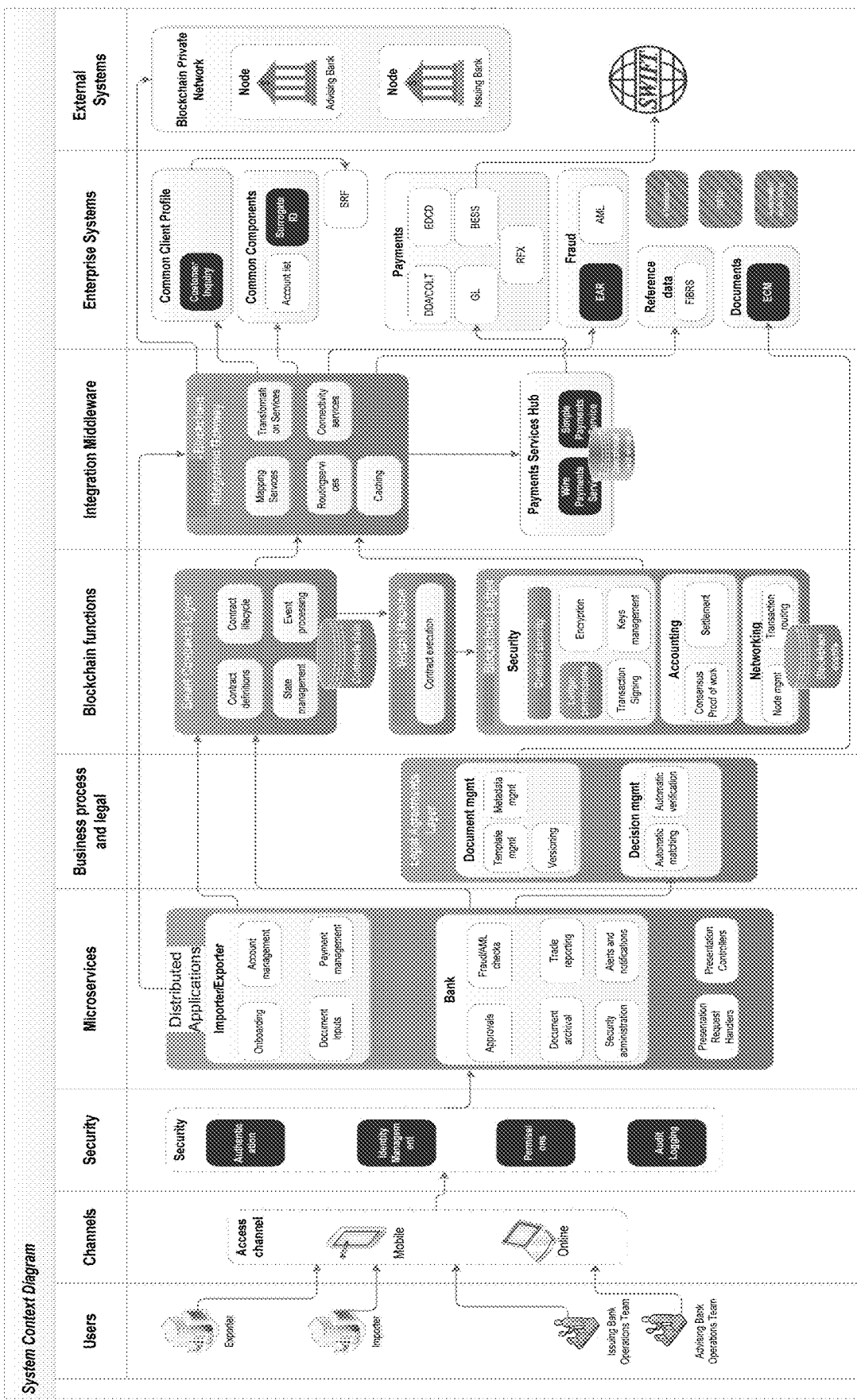
FIG. 11 is an example system context diagram that may be provided, illustrative of how the system may be implemented in the context of an institution's computing systems.

FIG. 11 is an example system context diagram that may be provided, illustrative of how the system 100 may be implemented in the context of an institution's computing systems. As indicated in FIG. 11, users may utilize various interface elements to import and/or export various aspects of information, through an access channel (e.g., through a mobile, or online interface).

A security layer may be utilized to conduct various aspects of authentication, identify management, assess available permissions, and to perform logging (e.g., for audit purposes). Users may utilize the interface to, for example, issue information for modifying various records stored on the distributed ledger (e.g., by generating a new record block to be added to the distributed ledger) or conduct queries (e.g., to generate reports) based on a traversal and/or analysis of information stored on the distributed ledger.

Distributed applications may be used to perform various tasks, the distributed applications interacting with various interaction layers, such as a legal agreements and a smart contracts layer. These layers may track version control, template management (e.g., template provisions), contractual metadata), etc.

These layers may interact directly with the blockchain ledger through an application programming interface, encapsulating various instructions and encoding the instructions in the form of blockchain specific commands (e.g., to add new records to the blockchain, traverse the records stored on the blockchain). The blockchain ledger may be configured to receive various instructions and/or commands, and to action on instructions and commands by applying various sets of ledger permissions, encryption, signing. The blockchain ledger may be adapted such that stored keys are managed (e.g., where multiple keys may be used to require a minimum number of signatures, a consensus of signatures, different access levels).

The blockchain ledger may apply various cryptographic techniques, such as tracking and/or maintaining consensus proofs of work, etc. The blockchain ledger may also track the number and characteristics of nodes provisioned, such as the reliability and/or uptime associated with a node, the characteristics and number of connections between various nodes, etc.

These layers may interface with a blockchain integration gateway, which may provide various types of services that are used to interact with downstream components, such as client profiles, payment systems, fraud detection utilities, comparison reference data databases, document management databases, etc.

The layers may provide various features, including a distributed system wherein distributed applications are able to leverage event driven designs to provide clear separation between business logic and technology concerns (security, logging, etc.), to aid in controlling application complexity and to facilitate ongoing maintainability. The modularization of the distributed applications may aid in providing explicit composition of contract operations, and clear delineation between past events (transactions) and future events (contracts).

The various layers may be adapted such that dynamic, ad-hoc and complex queries (joins, aggregations, filters etc.) may be performed on a resilient and fault tolerant platform. The various connections and communication links may be established such that communications are may support both synchronous and asynchronous communications, and in some embodiments, non-blocking APIs, to ensure decoupling of systems.

Figure 12:
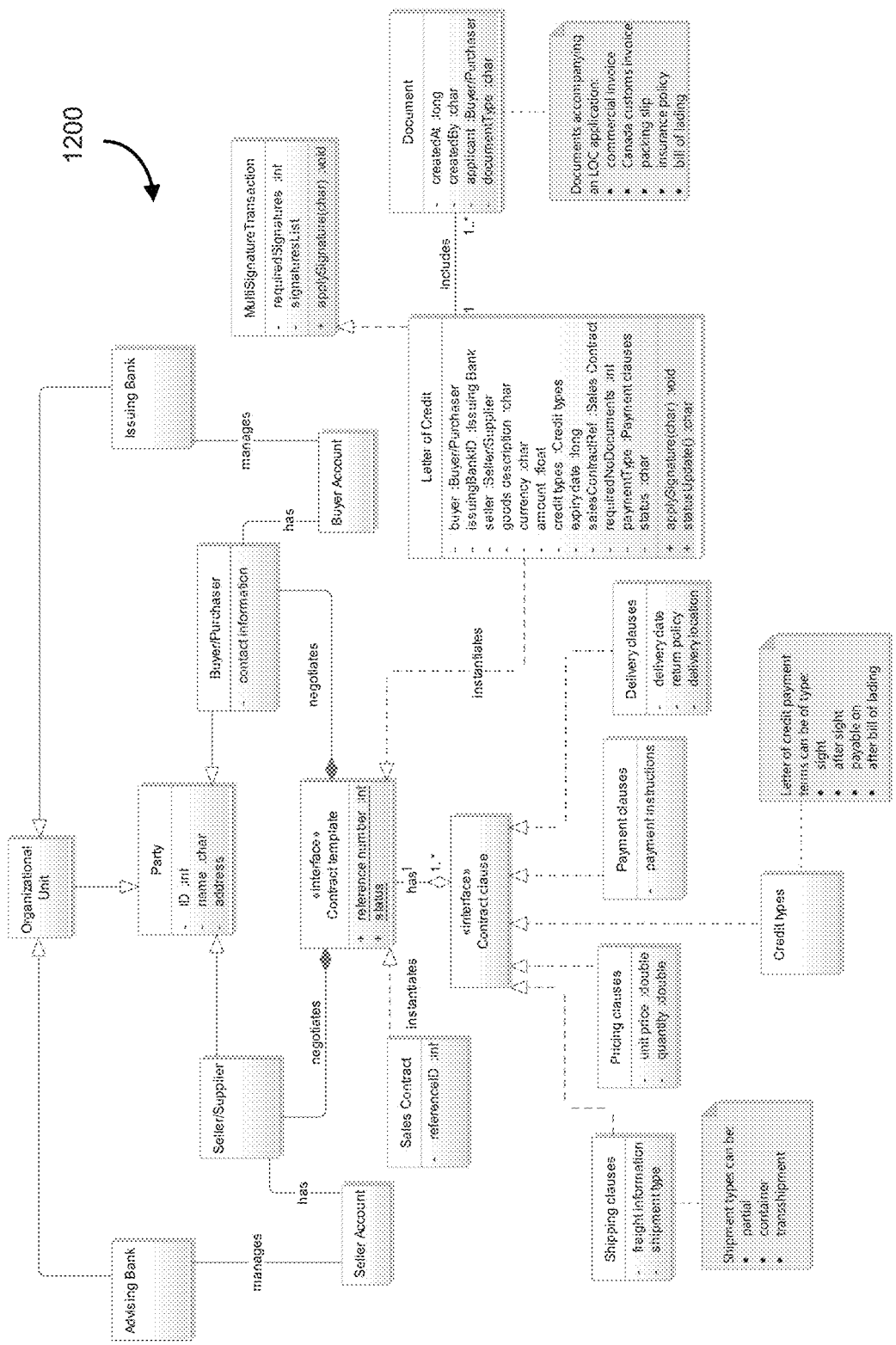
FIG. 12 is an example information model diagram illustrative of some of the variables and/or characteristics that may be tracked by an example system.

FIG. 12 is an example information model diagram illustrative of some of the variables and/or characteristics that may be tracked by an example system 100. The information may be tracked in the form of data stored on the distributed ledger, metadata, etc. As the records themselves may be cryptographically linked to one another, records stored on the distributed ledgers may be difficult and/or practically impossible to change once records are provided on the distributed ledgers.

As provided in the information model, elements may include:

1. Seller/beneficiary: full corporate name and address of the seller/beneficiary.
2. Amount: the actual amount of the letter of credit, as stated by the Seller. Can also use "approximate", "circa", or "about" to indicate an acceptable 10% plus or minus from the stated amount.
3. Validity: may include the time to ship and to prepare necessary documents.
4. Seller's Bank: the seller may list its advising bank as well as a reimbursing bank if applicable. The reimbursing bank is the local bank appointed by the issuing bank as the disbursing bank.
5. Type of Payment Availability: buyer and seller may agree to use sight drafts, time drafts, or some sort of deferred payment mechanism.
6. Desired Documents: buyer specifies the necessary documents (e.g. bill of lading, a commercial invoice, a certificate of origin, certificates of analysis, etc.)
7. Notify Address: address to notify upon the arrival of goods at the destination (port, airport).
8. Description of Goods: seller should provide a short and precise description of the goods as well as the quantity involved.
9. Confirmation Order: seller may wish to confirm the letter of credit with a bank in its country, among others.

The documents, as noted, may include, for example, the following:

1. Invoice: billing for the goods and services. The invoice includes a description of merchandise, price, shipping conditions (e.g., FOB (free on board) origin), and name and address of buyer and seller.
2. Bill of Lading: a document describing the receipt of goods for shipment and issued by a freight carrier engaged in the business of forwarding or transporting goods.
3. Warranty of Title: is given by a seller to a buyer of goods that states that the title being conveyed is good and that the transfer is rightful.
4. Letter of Indemnity: indemnifies the purchaser against a certain stated circumstance. Indemnification is generally used to guaranty that shipping documents will be provided in good order when available.

In some embodiments, the letter of credit block chain can incorporate one or more of the contract clauses as parameters and/or conditions which are to be satisfied in order to make subsequent clauses available to be satisfied and/or to indicate completion and/or failure of the letter of credit.

Figure 13:
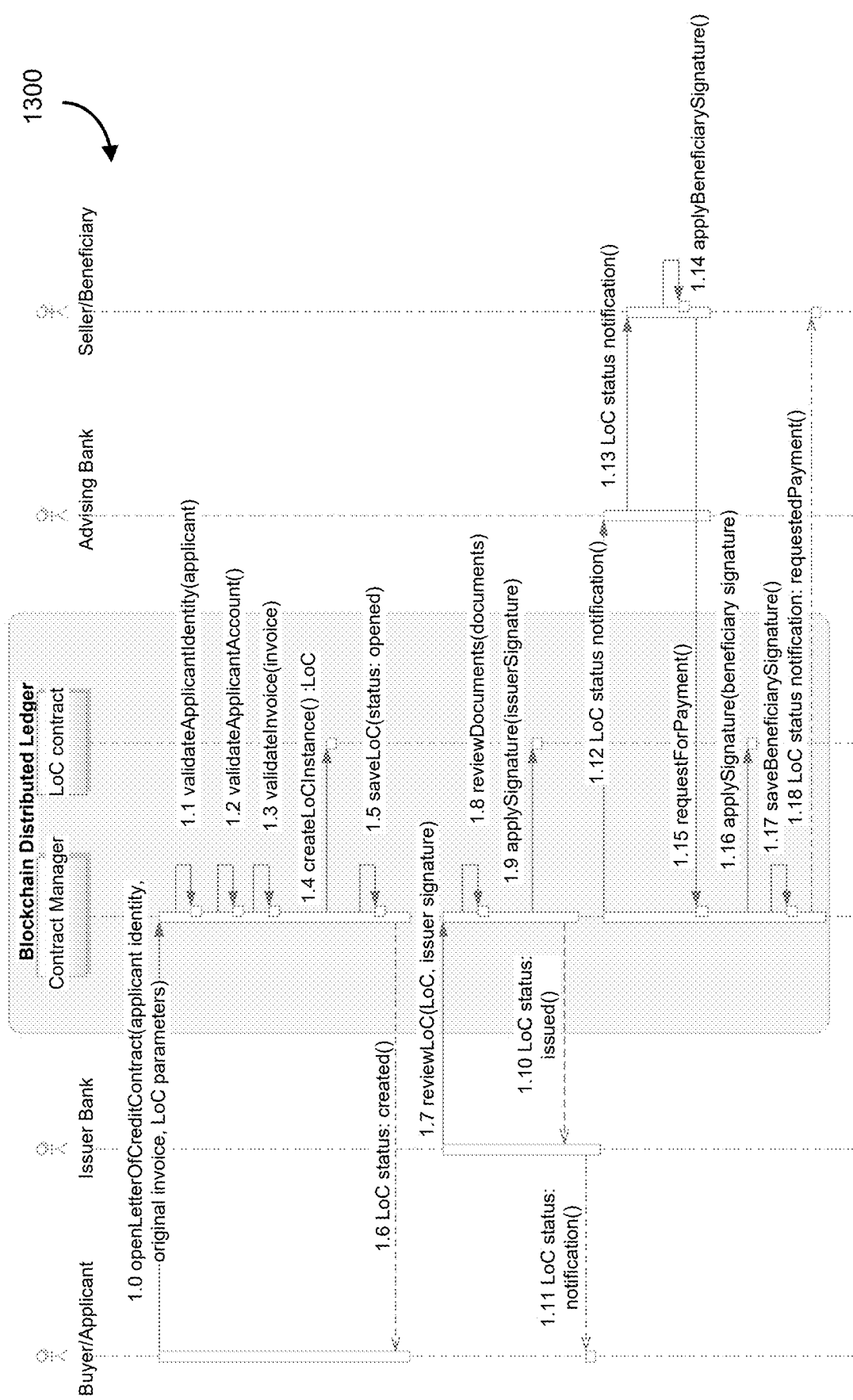
FIG. 13 is an example workflow provided wherein a buyer/applicant opens a letter of credit contract, and the blockchain distributed ledger is used to generate letter of credit instances following several steps of validation.

FIG. 13 is an example workflow provided wherein a buyer/applicant opens a letter of credit contract, and the blockchain distributed ledger is used to generate letter of credit instances following several steps of validation. In this example, there may be various parties:

Applicant (buyer): The party at whose request a bank issues a letter of credit.

Beneficiary (seller): The beneficiary is entitled to payment as long as he can provide the documentary evidence required by the letter of credit.

Issuing bank (opening bank): The bank issuing a letter of credit on behalf of the applicant (the buyer). Also called the opening bank. The issuing bank is guaranteeing payment at the due date Advising bank: usually located in the seller's country and its role is to take reasonable care to check the authenticity of the letter of credit and to advise the seller according to its instructions Confirming Bank: the correspondent bank may confirm the letter of credit for the beneficiary. Usually, it is the advising bank.

Signatures, modifications, contract reviews (e.g., by the issuer), are conducted based on the records stored on the blockchain distributed ledger, and the signature of the issuer may also be tracked on the blockchain distributed ledger.

Upon the signature of the issuer, a notification may be generated and provided to an advising bank, which may then provide such notification to a seller/beneficiary. The signature of the seller/beneficiary may be tracked and applied, and a request for payment may be provided, where the seller/beneficiary's signature may be applied in the blockchain distributed ledger. Upon application of various rules in the blockchain distributed ledger (and satisfaction thereof), a notification may be issued wherein the requested payment may be provided.

In some embodiments, receiving a signature can be a represented by a request to record a transaction on the distributed ledger of a node. The transaction including a private key associated with the profile of the party whose signature is required. In some embodiments, the transaction includes an indication that the transaction is a signature. In some embodiments, the transaction may include a digital signature or an image of a signature of the party.

Various validations may be performed by the advising bank, for example:

Letter of credit expiration date has not passed;
Documents are presented late;
Documents missing;
Documents incorrectly issued;
Names not the same as in Letter of credit;
Inconsistent description of goods: volume, quality;
Bill of Landing states delivery is prior or after a date range in Letter of credit;
Invoice amount not the same as draft amount;
Invoice not signed, is specified by Letter of credit terms;
Shipment is late, after the stipulated time of shipment; and
Shipping details are incorrect (e.g., loading/unloading at the wrong port, not on the specified ship, issued to the wrong order; shows part shipment or transshipment, if not allowed in the terms; packing/marking not according to terms), among others.

In approving the letter of credit, payment is released by buyer's issuing bank into the seller's account and documents are released to the buyer by the issuing bank. Where the letter of credit is not approved by the buyer, the buyer and seller may need to proceed for further negotiations. In any event, the letter of credit is updated and recorded in the ledger.

Figure 14:
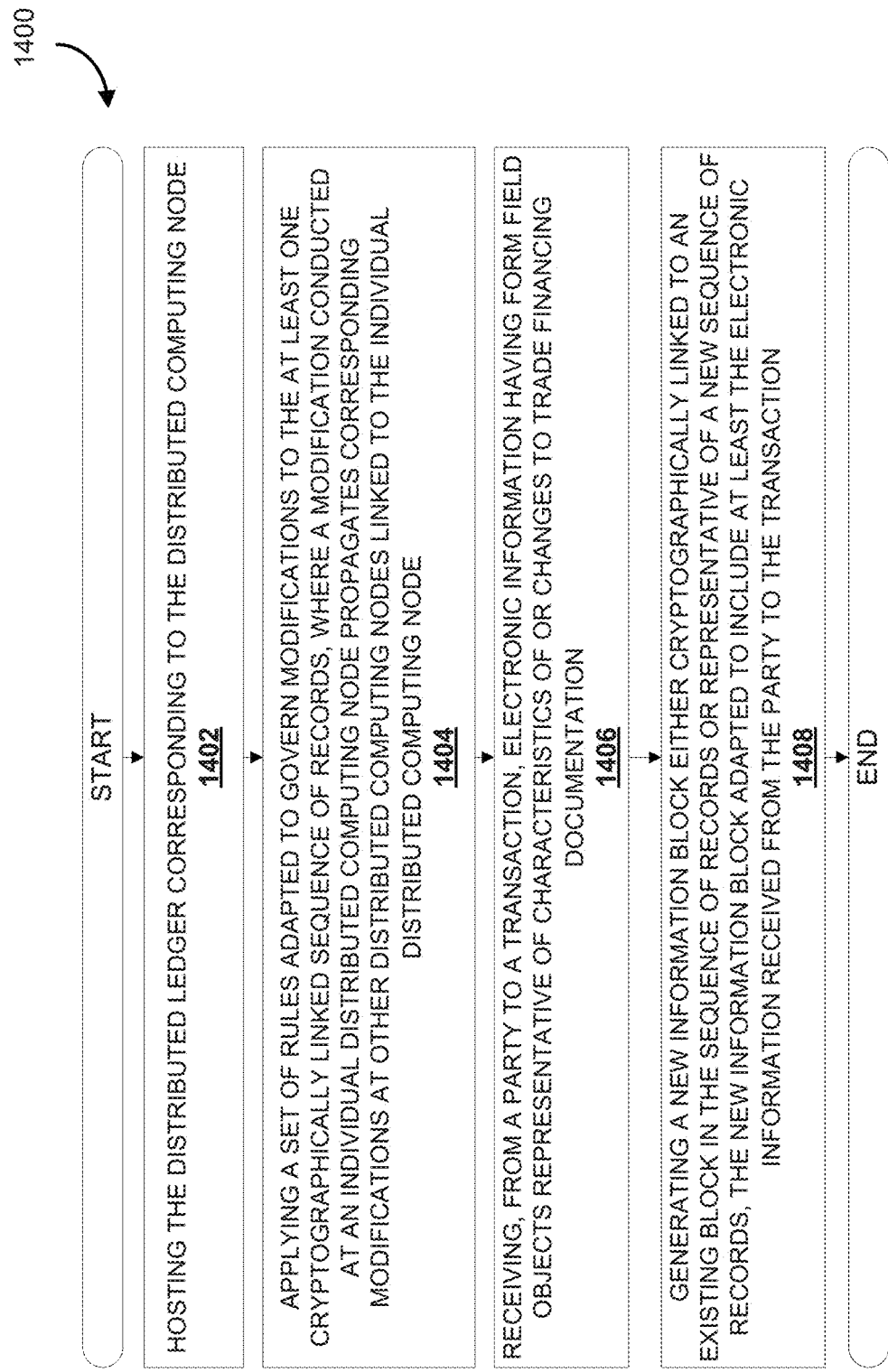
FIG. 14 is an example workflow illustrative of a sample method, according to some embodiments.

FIG. 14 is an example workflow 1400 illustrative of a sample method, according to some embodiments.

Example workflow 1400 may be conducted, for example, on system for providing an electronic document platform including at least a plurality of distributed electronic ledgers, each distributed electronic ledger storing at least one cryptographically linked sequence of records, the system comprising a plurality of distributed computing nodes, each distributed computing node comprising a processor and a computer-readable medium having machine-readable instructions stored thereon.

When the machine-readable instructions stored thereon are executed by the processor, cause the processor to, at 1402, host the distributed ledger corresponding to the distributed computing node.

At 1404, the distributed computing node may apply a set of rules adapted to govern modifications to the at least one cryptographically linked sequence of records, where a modification conducted at an individual distributed computing node propagates corresponding modifications at other distributed computing nodes linked to the individual distributed computing node.

At 1406, the distributed computing node may receive, from a party to a transaction, electronic information having form field objects representative of characteristics of or changes to trade financing documentation.

At 1408, the distributed computing node may generate a new information block either cryptographically linked to an existing block in the sequence of records or representative of a new sequence of records, the new information block adapted to include at least the electronic information received from the party to the transaction.

Figure 15:
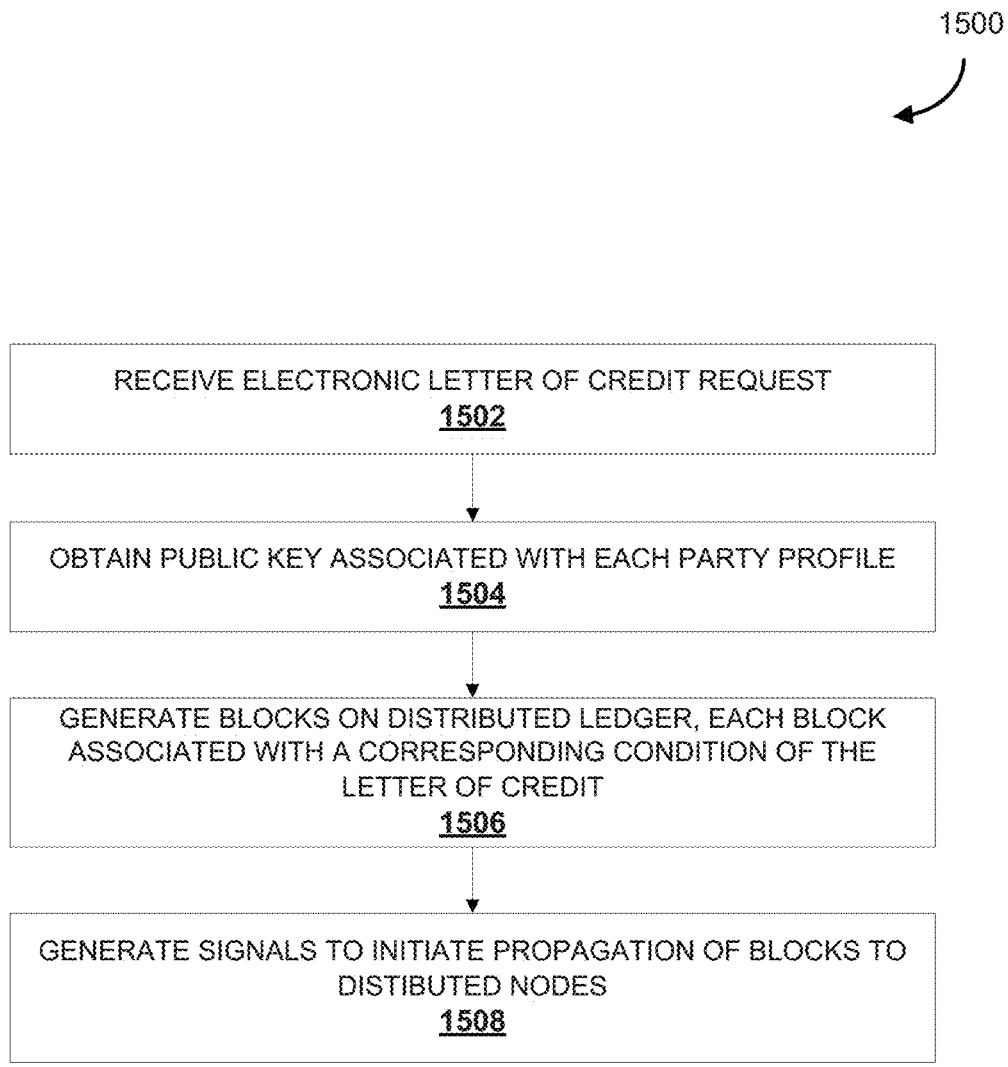
FIG. 15 is an example workflow showing aspects of an example method, according to some embodiments.

FIG. 15 is an example workflow 1500 showing aspects of an example method for managing conditions for electronic trade finance transactions, according to some embodiments. In some embodiments, aspects of the method can be implemented by one or more nodes 106. In some embodiments, aspects of the method can be implemented by one or more processors at the nodes 106 and/or elsewhere in the system 100.

At 1502, one or more processors at a node 106 or elsewhere in the system 100 receives a request to create a new letter of credit. In some embodiments, the letter of credit request identifies a number of parameters for the letter of credit. Parameters can include but are not limited to types of goods, quantities, shipment carrier parameters, shipping trade terms, shipment routes, dates/deadlines, and the like. In some embodiments, the parameters can be identified as text, numbers or enumerated values in one or more fields. In some embodiments, the parameters can be linked to or otherwise include text and/or images of an actual document defining the parameters. In some embodiments, the parameters may provide shipment information which can be verified/validated by a party by recording a transaction to the distributed ledger.

In some embodiments, the letter of credit request can include one or more identifiers for identifying one or more parties which may be involved in the letter of credit. For example, in some embodiments, parties may include applicants/buyers, issuers, advising banks, beneficiaries/sellers, carriers, handlers, customs/inspection entities, etc.

In some embodiments, party profiles can include profiles associated with a shipment carrier, a stevedore, a ship, a port, a custom officer, a warehouse, an inspection officer, and the like.

In some embodiments, the letter of credit request can include one or more conditions of the letter or credit. In some embodiments, these conditions are associated with one or more party profiles. In some embodiments, the parties corresponding to the profiles are authorized to access the condition and/or record transactions to verify the satisfaction or the failure to meet the condition. In some embodiments, conditions can include, but are not limited to: a party signing a document, a party handling goods verifying a type/quantity/condition/location/possession/etc. of the goods, and the like.

At 1504, one or more processors at the node 106 or elsewhere in the system 100 obtain a public key associated with each party profile associated with a condition in the letter of credit request. In some embodiments, public keys may be stored in a database in the system 100. In some embodiments, public keys may be managed by a certificate authority. In some embodiments, public keys may be stored and/or managed by a trusted party(ies) such as financial institutions.

In some embodiments, the one or more processors generate public-private key pairs for all party profiles associated with a condition. In some embodiments, the one or more processors generate public-private key pairs for each party profile for which a public key is not already available. The one or more processors then communicate the private key to the party, for example, to an address, account or device associated with the party profile.

At 1506, the one or more processors generate blocks on a distributed ledger on a node. In some embodiments, the processor(s) create a new distributed ledger for each new letter of credit. In some embodiments, one or more of the blocks are associated with a corresponding condition of the letter of credit. In some embodiments, each block is effected and/or encrypted with the public key corresponding to the party profile associated with the block's corresponding condition. In some embodiments, the block is encoded with the public key such that the private key is required to record a transaction against the block.

In some instances, the blocks are arranged to be sequentially dependent such that an earlier block in the chain must be satisfied (e.g. have a recorded transaction) before a subsequent block in the chain can be satisfied. In some embodiments, this may encapsulate conditions which are to be satisfied sequentially. For example, a condition that requires verification that goods were loaded onto a ship at a source location must be satisfied before a condition requiring verification that the goods arrived at a destination. In some embodiments, sequential conditions may be encapsulated by utilizing cascaded hashes of the keys.

In some instances, the blocks may be arranged in parallel or in a tree structure such that conditions may be satisfied in parallel. In some instances, the blocks may be arranged in any combination of serial, parallel, tree or other arrangements.

At 1508, after the blocks on the distributed ledger at the first node have been generated, the processors at the first node generate signals to initiate propagation of the blocks to the rest of the nodes.

In some embodiments, after the blocks on the distributed ledger at the first node have been generated, an initial condition is for a requesting party such as an applicant and/or an issuer is required to provide a validation/confirmation/signature that the distributed ledger instance reflects the letter of credit. In some embodiments, this condition may be encapsulated in an initial block in the distributed ledger. In some embodiments, the initial condition may or may not be satisfied before the distributed ledger is propagated at 1508.

Figure 16:
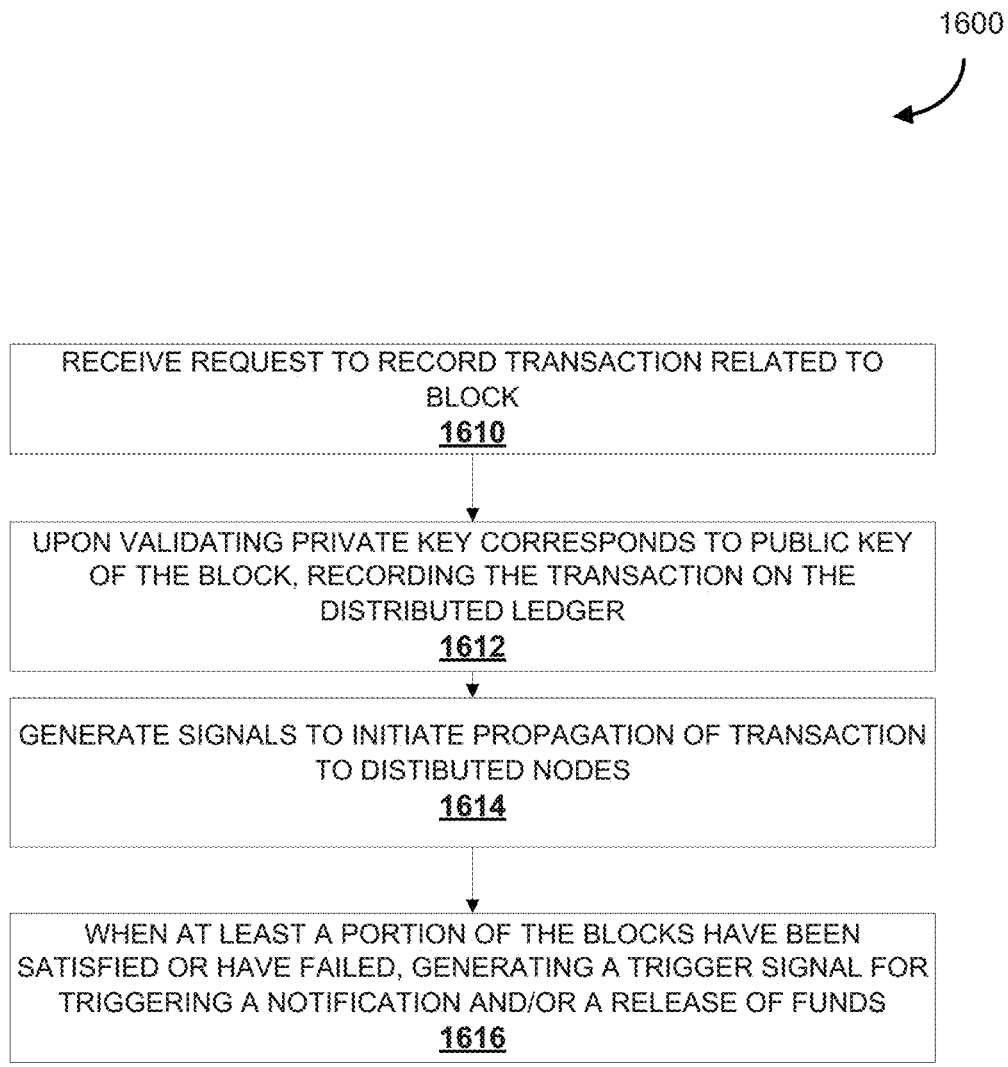
FIG. 16 is an example workflow showing aspects of an example method, according to some embodiments.

FIG. 16 is an example workflow 1600 showing aspects of an example method for managing conditions for electronic trade finance transactions, according to some embodiments. In some embodiments, aspects of the method can be implemented by one or more nodes 106. In some embodiments, aspects of the method can be implemented by one or more processors at the nodes 106 and/or elsewhere in the system 100.

In some embodiments, the aspects of the method in FIG. 16 may occur after the aspects discussed with respect to FIG. 15.

At 1610, one or more processors at a node 106 or elsewhere in the system 100 receive a request to record a transaction related to a block in the distributed ledger. In some embodiments, the request indicates that at least a portion of a condition associated with the block has been satisfied. In some embodiments, the request includes or otherwise utilizes a private key to record the transaction.

At 1612, upon validating that the private key corresponds to the public key of the block, the transaction is recorded on the distributed ledger. In some embodiments, the validation of the private key and the recordation of the transaction is a single step whereby the recordation will fail if the incorrect key is used.

In some embodiments, the transaction may indicate a satisfaction of the condition. In some embodiments, the transaction may indicate a failure of the condition.

In some embodiments, the transaction may indicate a partial satisfaction or partial failure of the condition. For example, if a party verifies that a portion of the goods arrived at a location, the transaction request may indicate a partial satisfaction of the condition, and a subsequent block may be generated to encapsulate a new condition based on the quality of goods which are still outstanding. In some embodiments, the new subsequent block may be encoded with the public key of the same party recording the transaction, or any other party which may be associated with the condition.

In another example, a transaction may indicate a partial or complete failure of a condition if some or all of the expected goods were lost or damaged during shipment.

In another example, a transaction may trigger the creation of new blocks. For example, in some embodiments, the party may be involved in the shipment process, and the transaction may indicate that the goods were rerouted. This may trigger the generation of new blocks and/or a new branch of blocks in the distributed ledger. For example, the new blocks may encapsulate conditions associated with the new shipment process such as arrival at different ports, verification/handling by different carriers, stevedores, etc.

In some embodiments, an initial new block may require authorization by an issuer, buyer, seller, and/or other party to verify that the party approves of the change in the shipment process.

At 1614, the processors generate signals to initiate propagation of the transaction and/or new blocks to the rest of the nodes.

At 1616, when the distributed ledger at a node associated with an issuer, advisor or other party holding funds is in a state where every block and their corresponding conditions have been satisfied, the node generates a trigger signal to initiate the release or transfer of funds in accordance with the letter of credit parameters.

In some embodiments, the trigger signal is a communication message to notify the party that the conditions have been satisfied and that the funds can be transferred.

In some embodiments, the trigger signal is an instruction or other signal which automatically triggers the transfer or release of the funds.

In some embodiments, when the distributed ledger at the node associated with a fund-holding party is in a state where one or more conditions have failed, the node generates a trigger signal to communicate the failure to one or more parties.

In some embodiments, when the distributed ledger at the node associated with a fund-holding party indicates partial completion of one or more conditions, the node may generates a trigger signal to initiate a partial release or transfer of funds in accordance with the letter of credit parameters.

In some embodiments, the distributed ledger may be a public ledger accessible, stored and/or maintained by all nodes in the system. In some embodiments, a node may receive a status request, and may be configured to query the ledger to identify and report a most recently recorded transaction and/or the status of various conditions of the letter of credit.

In some embodiments, the public nature of the ledger may create a technical challenge when aspects of different blocks contain sensitive information. For example, it may not be desirable for a stevedore unloading a ship to have full access to information regarding the cost of goods or the transacting parties and bank account information.

In some embodiments, the processors of a node 106 creating a distributed ledger or new blocks may be configured to encrypt parameters associated with one or more blocks or with the letter of credit as a whole with one or more encryption keys.

In some embodiments, the encryption keys used to encrypt the parameters may be based on an access level associated with a particular block or parameter. In some embodiments, the blocks associated with the shipment process may only include the parameters accessible by shipment process handlers. For example, stevedores or shipment process handlers may only have access to information regarding goods descriptions, quantities, routes and locations.

In some embodiments, financial and cost information may only be available to financial parties, and the buyer or seller. Accordingly, blocks involving these parameters may only include parameters accessible by the necessary parties.

In some embodiments, the parameters of a particular block may be encoded with the public key of the party profile associated with the block. Accordingly, a party may only be able to decrypt and read the parameters for its own blocks.

In some embodiments, parameters may be encoded with a group or class of keys. For example, shipment process handlers may have a shared key which can decrypt any block parameters associated with shipment process conditions.

In some embodiments, financial institution parties, buyers and/or sellers may have a shared key which can decrypt any block parameters associated with financial conditions. In some embodiments, these parties may also have the shipment process handler key so they can monitor the shipment process.

General

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized.

As can be understood, the examples described above and illustrated are intended to be exemplary only.

Figure 17:
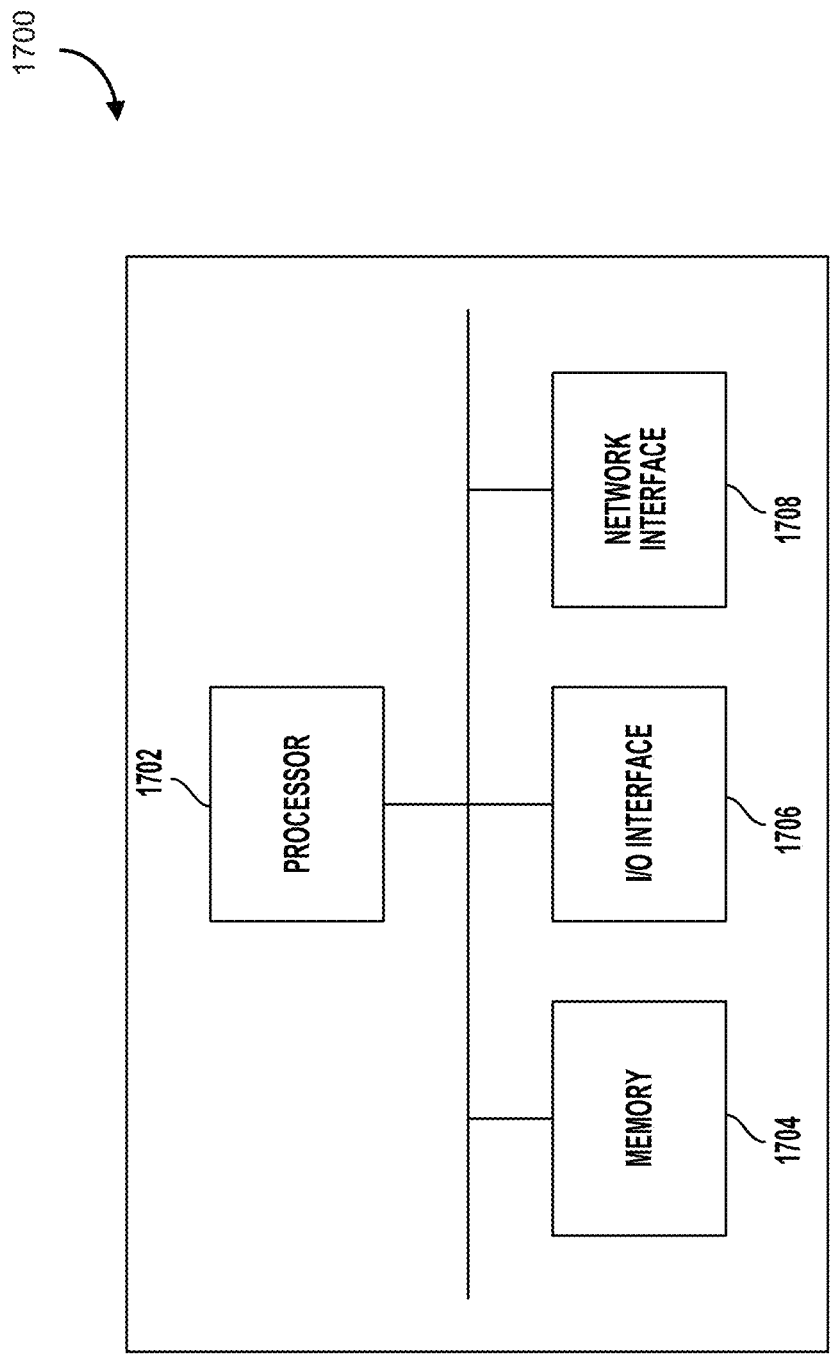
FIG. 17 is a schematic diagram of computing device, exemplary of an embodiment.

FIG. 17 is a schematic diagram of computing device 1700, exemplary of an embodiment. As depicted, computing device 1700 includes at least one processor 1702, memory 1704, at least one I/O interface 1706, and at least one network interface 1708.

Each processor 1702 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1704 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1706 enables computing device 1700 to interconnect with one or more input devices, such as a keyboard, mouse, camera, touch screen and a microphone, or with one or more output devices such as a display screen and a speaker.

Each network interface 1708 enables computing device 1700 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 1700 is operable to register and authenticate users (using a login, unique identifier, and password for example) prior to providing access to applications, a local network, network resources, other networks and network security devices. Computing devices 1700 may serve one user or multiple users.

What is claimed is:

1. A method for managing a plurality of conditions for electronic trade finance transactions utilizing distributed ledgers of a blockchain system where distributed ledger blocks corresponding to conditions of an electronic document are stored on a series of decentralized devices acting as nodes, each node having a copy of the distributed ledgers being maintained on the each node in accordance with electronic propagation mechanisms, each electronic trade finance transaction including a bank guarantee and a payment that is triggered upon a satisfaction of trade finance transaction parameters, the method comprising:

receiving a new electronic letter of credit request, the request identifying letter of credit parameters, and at least one condition of the letter of credit associated with corresponding party profiles;

obtaining a public key associated with each of the party profiles;

generating a plurality of blocks on a distributed ledger on a node of a distributed plurality of nodes, wherein each of the plurality of blocks is associated with a corresponding condition of the at least one condition to be effected and encrypted with a public key corresponding to the party profile associated with the corresponding condition of the at least one condition, wherein the plurality of blocks are cryptographically sequentially dependent and interconnected in a sequential arrangement such that a corresponding condition of a first block in the plurality of blocks must be satisfied prior to the satisfaction of a corresponding condition of a second block in the plurality of blocks, wherein the corresponding conditions of the first and second blocks are cryptographically sequentially dependent and interconnected in a sequential arrangement by assigning the second block with a cascaded hash of the public key corresponding to the party profile associated with the corresponding condition of the first block, wherein the cascaded hash is generated by applying a cryptographic hash function to the public key, and wherein the corresponding condition of the first block comprises a logistics hub generating and transmitting a private key corresponding to the public key and using the private key to unlock the first block;

satisfying at least a portion of a condition corresponding to a specific block of the interconnected distributed ledger blocks; and receiving, at a node of the blockchain system, a transaction message indicative of satisfaction of at least a portion of the condition corresponding to the specific block of the interconnected distributed ledger blocks;

upon validating, by the node of the blockchain system, that the transaction message is signed using a private key that corresponds to the public key of the specific block of the interconnected distributed ledger blocks, recording the transaction message on the distributed ledger of the node indicating satisfaction of at least a portion of the condition corresponding to the specific block of the interconnected distributed ledger blocks;

generating signals to initiate propagation of the transaction message to the distributed plurality of nodes; and transmitting the generated signals to the distributed plurality of nodes.

2. The method of claim 1, wherein each party profile corresponds to a corresponding shipping management or inventory management device.

3. The method of claim 2, comprising:

upon a ledger of a node of the distributed plurality of nodes associated with a fund-holding party having a state wherein each of the plurality of blocks associated with a corresponding condition have been satisfied by one or more propagated transactions, generating a trigger signal for initiating a release of funds in accordance with the trade finance transaction parameters.

4. The method of claim 1, wherein the trade finance transaction parameters include data for validation by a corresponding party to confirm a condition has been satisfied; the method comprising: encrypting the data for validation with the public key associated with the party profile of the corresponding party.

5. The method of claim 1, wherein each party profile corresponding to at least one condition of the trade finance transaction is associated with a least one node in the distributed plurality of nodes.

6. The method of claim 5, wherein the party profiles include profiles associated with parties involved in a shipment process associated with the trade finance transaction; and wherein at least one of the conditions of the trade finance transaction is based on the shipment process.

7. The method of claim 6, wherein the party profiles include profiles associated with at least one of: a shipment carrier, a stevedore, a ship, a port, a custom officer, a warehouse, or an inspection officer.

8. The method of claim 6, comprising:

receiving, at a node of the distributed plurality of nodes, a modification request to modify at least one parameter or condition associated with the shipment process, the request encoded with the public key associated with a party profile of a party required to validate the modification request;

recording a branch of blocks on the distributed ledger of the node, the branch of blocks indicating of the requested modification to the shipment process, the branch of blocks including an initial block to be effected by a transaction and encrypted with a public key associated with at least one authorizing party; and generating signals to initiate propagation of the branch across the distributed plurality of nodes.

9. The method of claim 1, wherein the plurality of blocks are ordered with a cascaded hash such that a second transaction cannot be recorded before a first transaction has been recorded on a distributed ledger.

10. The method of claim 1, comprising: receiving a status request; and querying the distributed ledger to identify a most recently recorded transaction.

11. The method of claim 1, comprising:
generating a public-private key pair for each of the of party profiles; and
communicating the private key from the public-private key pair to the corresponding party.

12. The method of claim 1, wherein the trade finance transaction parameters include at least one of: a goods identifier, a quantity, shipping trade terms, or carrier terms.

13. The method of claim 1, wherein the plurality of blocks includes blocks in a tree structure, each branch of the tree structure defining conditions for partial satisfaction of the conditions of the trade finance transaction, wherein completion of conditions associated with a particular branch triggers partial release of funds in accordance with the trade finance transaction parameters.

14. The method of claim 13, wherein the conditions of the particular branch are associated with a partial shipment of goods in accordance with the trade finance transaction parameters.

15. The method of claim 1, wherein each block of the plurality of blocks on the distributed ledger is encrypted based on an access level associated with the block.

16. A system for managing a plurality of conditions for electronic trade finance transactions utilizing distributed ledgers of a blockchain system where distributed ledger blocks corresponding to conditions of an electronic document are stored on a series of decentralized devices acting as nodes, each node having a copy of the distributed ledgers being maintained on the each node in accordance with electronic propagation mechanisms, each electronic trade finance transaction including a bank guarantee and a payment that is triggered upon a satisfaction of trade finance transaction parameters, the system comprising:
a memory device for storing distributed ledger data; and
at least one processor of one or more of the plurality of nodes configured for:
receiving a new electronic letter of credit request, the request identifying letter of credit parameters, and at least one condition of the letter of credit associated with corresponding party profiles;
obtaining a public key associated with each of the party profiles;
generating a plurality of blocks on a distributed ledger on a node of a distributed plurality of nodes, wherein each of the plurality of blocks is associated with a corresponding condition of the at least one condition to be effected and encrypted with a public key corresponding to the party profile associated with the corresponding condition of the at least one condition, wherein the plurality of blocks are cryptographically sequentially dependent and interconnected in a sequential arrangement such that a corresponding condition of a first block in the plurality of blocks must be satisfied prior to the satisfaction of a corresponding condition of a second block in the plurality of blocks, wherein the corresponding conditions of the first and second blocks are cryptographically sequentially dependent and interconnected in a sequential arrangement by assigning the second block with a cascaded hash of the public key corresponding to the party profile associated with the corresponding condition of the first block, wherein the cascaded hash is generated by applying a cryptographic hash function to the public key, and wherein the corresponding condition of the first block comprises a logistics hub generating and transmitting a private key corresponding to the public key and using the private key to unlock the first block;
receiving, at a node of the blockchain system, a transaction message indicative of satisfaction of at least a portion of a condition corresponding to a specific block of the interconnected distributed ledger blocks;
upon validating, by the node of the blockchain system, that the transaction message is signed using a private key that corresponds to the public key of the specific block of the interconnected distributed ledger blocks, recording the transaction message on the distributed ledger of the node indicating satisfaction of at least a portion of the condition corresponding to the specific block of the interconnected distributed ledger blocks and
generating signals to initiate propagation of the plurality of transaction message to the distributed plurality of nodes; and
transmitting the generated signals to the distributed plurality of nodes.

17. The system of claim 16, wherein each party profile corresponds to a corresponding shipping management or inventory management device.

18. The system of claim 17, wherein at least one processor of one or more of the plurality of nodes is configured for:
upon a ledger of a node of the distributed plurality of nodes associated with a fund-holding party having a state wherein each of the plurality of blocks associated with a corresponding condition have been satisfied by one or more propagated transactions, generating a trigger signal for initiating a release of funds in accordance with the trade finance transaction parameters.

19. The system of claim 16, wherein the trade finance transaction parameters include data for validation by a corresponding party to confirm a condition has been satisfied; and wherein at least one processor of one or more of the plurality of nodes is configured for: encrypting the data for validation with the public key associated with the party profile of the corresponding party.

20. The system of claim 16, wherein each party profile corresponding to at least one condition of the trade finance transaction is associated with a least one node in the distributed plurality of nodes.

\* \* \* \* \*

UNITED STATES PATENT AND TRADEMARK OFFICE
CERTIFICATE OF CORRECTION

PATENT NO. : 12,380,444 B2
APPLICATION NO. : 17/508362
DATED : August 5, 2025
INVENTOR(S) : Iustina-Miruna Vintila It is certified that error appears in the above-identified patent and that said Letters Patent is hereby corrected as shown below:

In the Claims

Column 24, Line 55 – Column 25, Line 2 (Claim 8):
"The method of claim 6, comprising: receiving, at a node of the distributed plurality of nodes, a modification request to modify at least one parameter or condition associated with the shipment process, the request encoded with the public key associated with a party profile of a party required to validate the modification request; recording a branch of blocks on the distributed ledger of the node, the branch of blocks indicating of the requested modification to the shipment process, the branch of blocks including an initial block to be effected by a transaction and encrypted with a public key associated with at least one authorizing party; and
generating signals to initiate propagation of the branch across the distributed plurality of nodes."

Should read:
-- The method of claim 6, comprising: receiving, at a node of the distributed plurality of nodes, a modification request to modify at least one parameter or condition associated with the shipment process, the request encoded with the public key associated with a party profile of a party required to validate the modification request; recording a branch of blocks on the distributed ledger of the node, the branch of blocks indicating the requested modification to the shipment process, the branch of blocks including an initial block to be effected by a transaction and encrypted with a public key associated with at least one authorizing party; and
generating signals to initiate propagation of the branch across the distributed plurality of nodes. --

Column 25, Lines 10 – 14 (Claim 11):
"The method of claim 1, comprising: generating a public-private key pair for each of the of party profiles; and communicating the private key from the public-private key pair to the corresponding party."

Should read:

Signed and Sealed this
Thirtieth Day of September, 2025

John A. Squires
*Director of the United States Patent and Trademark Office*

CERTIFICATE OF CORRECTION (continued)
U.S. Pat. No. 12,380,444 B2

-- The method of claim 1, comprising: generating a public-private key pair for each of the party profiles; and
communicating the private key from the public-private key pair to the corresponding party. --

Column 26, Lines 22 – 30 (Claim 16):
"upon validating, by the node of the blockchain system, that the transaction message is signed using a private key that corresponds to the public key of the specific block of the interconnected distributed ledger blocks, recording the transaction message on the distributed ledger of the node indicating satisfaction of at least a portion of the condition corresponding to the specific block of the interconnected distributed ledger blocks and"

Should read:
-- upon validating, by the node of the blockchain system, that the transaction message is signed using a private key that corresponds to the public key of the specific block of the interconnected distributed ledger blocks, recording the transaction message on the distributed ledger of the node indicating satisfaction of at least a portion of the condition corresponding to the specific block of the interconnected distributed ledger blocks; --

Column 26, Lines 39 – 47 (Claim 18):
"18. The system of claim 17, wherein at least one processor of one or more of the plurality of nodes is configured for: upon a ledger of a node of the distributed plurality of nodes associated with a fund-holding party having a state wherein each of the plurality of blocks associated with a corresponding condition have been satisfied by one or more propagated transactions, generating a trigger signal for initiating a release of funds in accordance with the trade finance transaction parameters."

Should read:
-- 18. The system of claim 17, wherein the at least one processor of the one or more of the plurality of nodes is configured for: upon a ledger of a node of the distributed plurality of nodes associated with a fund-holding party having a state wherein each of the plurality of blocks associated with a corresponding condition has been satisfied by one or more propagated transactions, generating a trigger signal for initiating a release of funds in accordance with the trade finance transaction parameters. --

Column 26, Lines 48 – 54 (Claim 19):
"19. The system of claim 16, wherein the trade finance transaction parameters include data for validation by a corresponding party to confirm a condition has been satisfied; and wherein at least one processor of one or more of the plurality of nodes is configured for: encrypting the data for validation with the public key associated with the party profile of the corresponding party."

Should read:
-- 19. The system of claim 16, wherein the trade finance transaction parameters include data for validation by a corresponding party to confirm a condition has been satisfied; and wherein the at least one processor of the one or more of the plurality of nodes is configured for: encrypting the data for validation with the public key associated with the party profile of the corresponding party. --